US011936190B1

(12) United States Patent
Moorman

(10) Patent No.: US 11,936,190 B1
(45) Date of Patent: Mar. 19, 2024

(54) CONTROLLER FOR A PORTABLE MICROGRID SYSTEM AND METHODS OF USE

(71) Applicant: Moser Energy Systems, Evansville, WY (US)

(72) Inventor: Darrin Moorman, Johnstown, CO (US)

(73) Assignee: MOSER ENERGY SYSTEMS, Evansville, WY (US)

(*) Notice: Subject to any disclaimer, the term of this patent is extended or adjusted under 35 U.S.C. 154(b) by 0 days.

(21) Appl. No.: 18/467,285

(22) Filed: Sep. 14, 2023

Related U.S. Application Data

(60) Provisional application No. 63/375,649, filed on Sep. 14, 2022.

(51) Int. Cl.
*H02J 3/46* (2006.01)
*B60L 53/51* (2019.01)
*B60L 53/53* (2019.01)
*B60L 53/62* (2019.01)
*B60L 53/64* (2019.01)
*G06Q 30/0283* (2023.01)
*H02J 3/38* (2006.01)

(52) U.S. Cl.
CPC ............... *H02J 3/46* (2013.01); *B60L 53/51* (2019.02); *B60L 53/53* (2019.02); *B60L 53/62* (2019.02); *B60L 53/64* (2019.02); *G06Q 30/0283* (2013.01); *H02J 3/381* (2013.01); *H02J 2300/24* (2020.01)

(58) Field of Classification Search
CPC .......... H02J 3/46; H02J 3/381; H02J 2300/24; B60L 53/51; B60L 53/53; B60L 53/62
USPC ............................................. 307/25; 700/295
See application file for complete search history.

(56) References Cited

U.S. PATENT DOCUMENTS

| | | | |
|---|---|---|---|
| 8,716,978 B2 | 5/2014 | Kim | |
| 9,365,127 B2 | 6/2016 | Olsson | |
| 9,960,637 B2 | 5/2018 | Sanders et al. | |
| 10,279,698 B2 | 5/2019 | Bridges et al. | |
| 10,336,205 B2 | 7/2019 | O'Connell et al. | |
| 10,647,209 B2 | 5/2020 | Haas et al. | |
| 11,007,891 B1 | 5/2021 | Kamal et al. | |
| 11,267,358 B2 | 3/2022 | Smolenaers | |

(Continued)

OTHER PUBLICATIONS

Borlaug et al., Joule 4: Levelized Cost of Charging Electric Vehicles in the United States, Jul. 15, 2020, pp. 1470-1485, Elsevier Inc.

(Continued)

*Primary Examiner* — Michael R. Fin
(74) *Attorney, Agent, or Firm* — HAYNES AND BOONE, LLP

(57) ABSTRACT

A system and method for managing and distributing an electrical power system is provided. In one embodiment, the system and method comprise at least one powered device that receives electrical power from an electrical power system utilizing multiple energy sources. Structure and devices are provided within the system to command, regulate, monitor, and transmit power to a device or devices in an efficient, reliable manner based on resource availability, energy cost, and environmental factors. The system selects and manages the resources to optimize the energy output to the device(s) to achieve the specific requirements in resiliency, cost, and the environmental impact of the application.

20 Claims, 11 Drawing Sheets

(56) References Cited

U.S. PATENT DOCUMENTS

| | | |
|---|---|---|
| 2016/0347195 A1 | 12/2016 | Bridges et al. |
| 2019/0168630 A1 | 6/2019 | Mrlik et al. |
| 2022/0084348 A1 | 3/2022 | Lowenthal et al. |
| 2022/0115877 A1 | 4/2022 | Stanfield et al. |
| 2023/0231379 A1* | 7/2023 | Albert ............... H02J 3/004 700/291 |

OTHER PUBLICATIONS

Petrusic et al., MDPI Applied Sciences Article: Renewable Energy Tracking and Optimization in a Hybrid Electric Vehicle Charging Station, 17 pages, 2020, Basel, Switzerland.

Muna et al., MDPI Energies Article: Feasibility and Techno-Economic Analysis of Electric Vehicle Charging of PV/Wind/Diesel/Battery Hybrid Energy System with Different Battery Technology, 20 pages, 2022, Basel, Switzerland.

Zhao et al., Its UCDAVIS Research Report—UCD-ITS-RR-14-18: An Intelligent Solar-Powered Battery-Buffered EV Charging Station with Solar Electricity Forecasting and EV Charging Load Projection Functions, Dec. 2014, 8 pages, Davis, California.

Kajanova et al., MDPI Applied Sciences Article: The Vehicle-to-Grid Concept with Respect to the Preferences of Electric Vehicle Drivers and Charging Station Operators, 19 pages, 2022, Basel, Switzerland.

* cited by examiner

925

925a
Receiving a target net profit per charge

925b
Determining a total price to charge the user for completing the charge request 925c
Calculating the target energy cost based on the target net profit per charge and the total price to charge the user for completing the charge request

925x
Identifying optimized charge parameter(s) for the charge request

925y
Displaying one or more of the optimized charge parameter(s) to the user

925z
Receiving a selection of one of the displayed parameters, where the selected parameter is the preferred charge parameter(s)

FIG. 11

CONTROLLER FOR A PORTABLE MICROGRID SYSTEM AND METHODS OF USE

RELATED APPLICATION

This application claims priority to and the benefit of the filing date of U.S. Provisional Application No. 63/375,649, titled "Controller for an Electric Vehicle Charger" and filed on Sep. 14, 2022, the disclosure of which is incorporated herein in its entirety.

FIELD OF DISCLOSURE

The disclosure herein relates, in general, to a system and method for managing and distributing electrical power, specifically, using a controller for a portable microgrid system configured to receive power from a plurality of different energy resources.

BACKGROUND

In recent years, there has been an increase in demand for electric vehicles (EVs) in order to reduce reliance on fossil fuels and decrease the overall carbon footprint. Many automobile manufacturers have announced plans to release a new line of EVs, become fully electric, or invest a certain amount of capital toward EVs. However, like all new technology, problems have arisen with its introduction. In particular, the adoption of EVs is challenged considerably by the lack of fast-charging resources in some areas. Further, utility power will inevitably be slow to expand access to the rapid EV charging facilities that are necessary for widespread adoption. Thus, one of the biggest challenges to the deployment of EV chargers is the absence of adequate grid infrastructure necessary to support the high intensity and variability of Level 3 charger loads.

Further, as natural events like hurricanes and tornadoes become more intense, widespread damage to existing electrical infrastructure required to provide fast-charging, both for EVs and other electric devices, will become more prevalent. Thus, those evacuating, living in those areas affected by natural disasters, and/or visiting those areas will require something to replace or supplement the standard charging infrastructure in the immediate time before an event, during the event, and after the event.

As such, EV and other large portable chargers will require unconventional means of charging both in the near and long term. A potential solution to the lack of adequate grid resources for reliable, fast-charging, is the use of off-grid or behind-the-meter energy resources. Off-grid and/or behind-the-meter charging will require a mix of energy resources, advanced control and data analytics to provide safe, effective, and economically optimal solutions. The mix of energy resources creates an unavoidable variability in cost and environmental impact that must be measured, controlled, communicated, and optimized. Additionally, advancing the adoption of off-grid or behind-the-meter charging must be attractive with risk mitigation for private investment. Further, messaging to the consumer is key to achieving a disruptive force in the adoption of new technology and methods. Here, some key questions for the consumer would be "Would you like to know what type of energy resource was used to charge your vehicle or device?" and "If you could choose an option that was more environmentally friendly, would you be willing to pay more for it?" For effective and rapid adoption, technology must align with social and political trends.

Thus, a system and method for managing and controlling the variabilities inherent with off-grid and behind-the-meter charging methods can be effective in providing safe, reliable fast-charging to EVs and other devices in the absence of adequate grid resources, while also leading to a viral adoption by consumers and investors and maximizing the economic viability of the electrical power system delivering the charge.

BRIEF DESCRIPTION OF THE DRAWINGS

FIG. 10 is a flow chart diagram of a portion of the method illustrated in FIG. 9, according to one or more aspects of the present disclosure.

FIG. 11 is a flow chart diagram of a portion of the method illustrated in FIG. 9, according to one or more aspects of the present disclosure.

DETAILED DESCRIPTION

Figure 1:
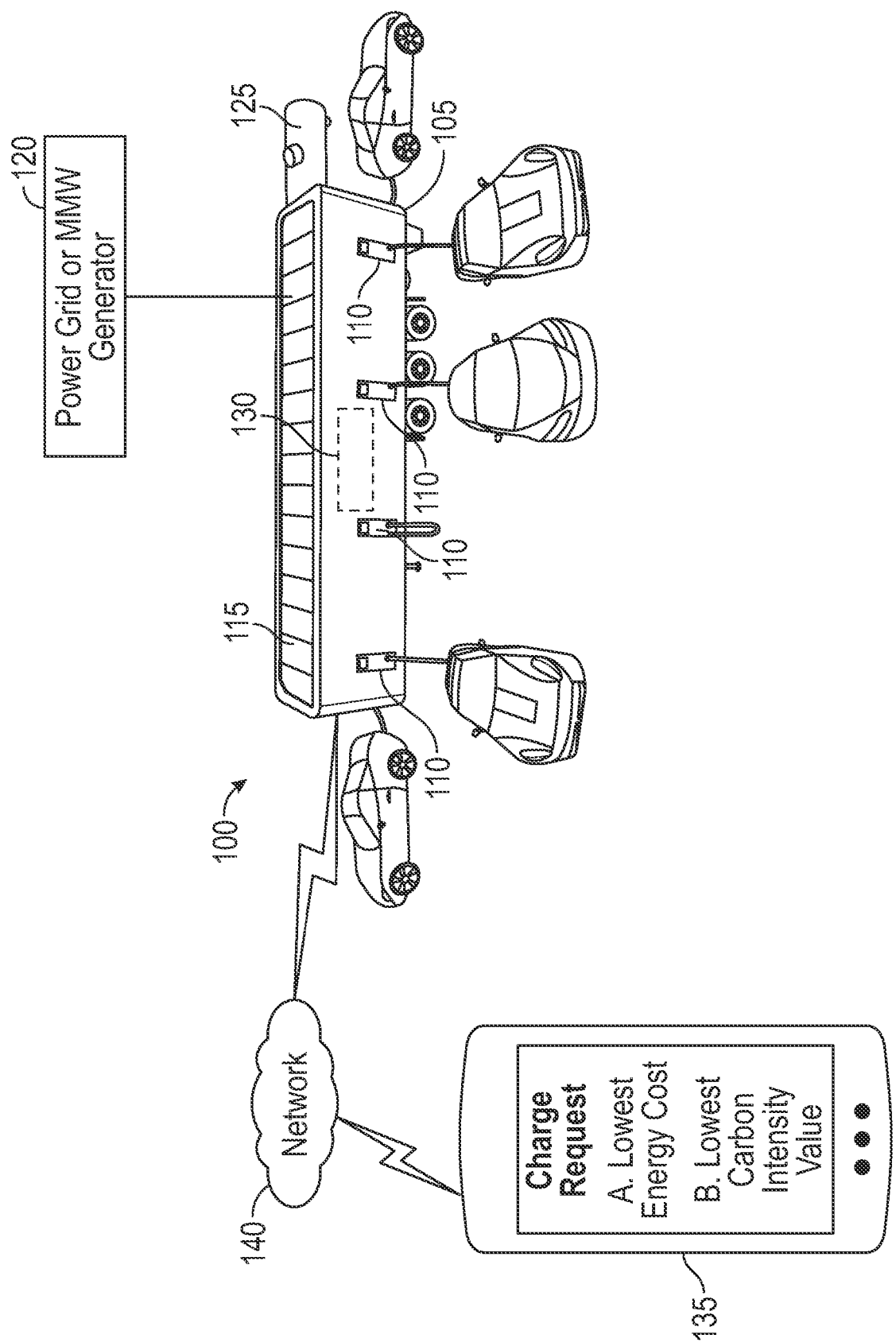
FIG. 1 is an illustration of a portable microgrid system including a structure and a controller communicating with a communication device via a network, according to one or more aspects of the present disclosure.
Figure 2:
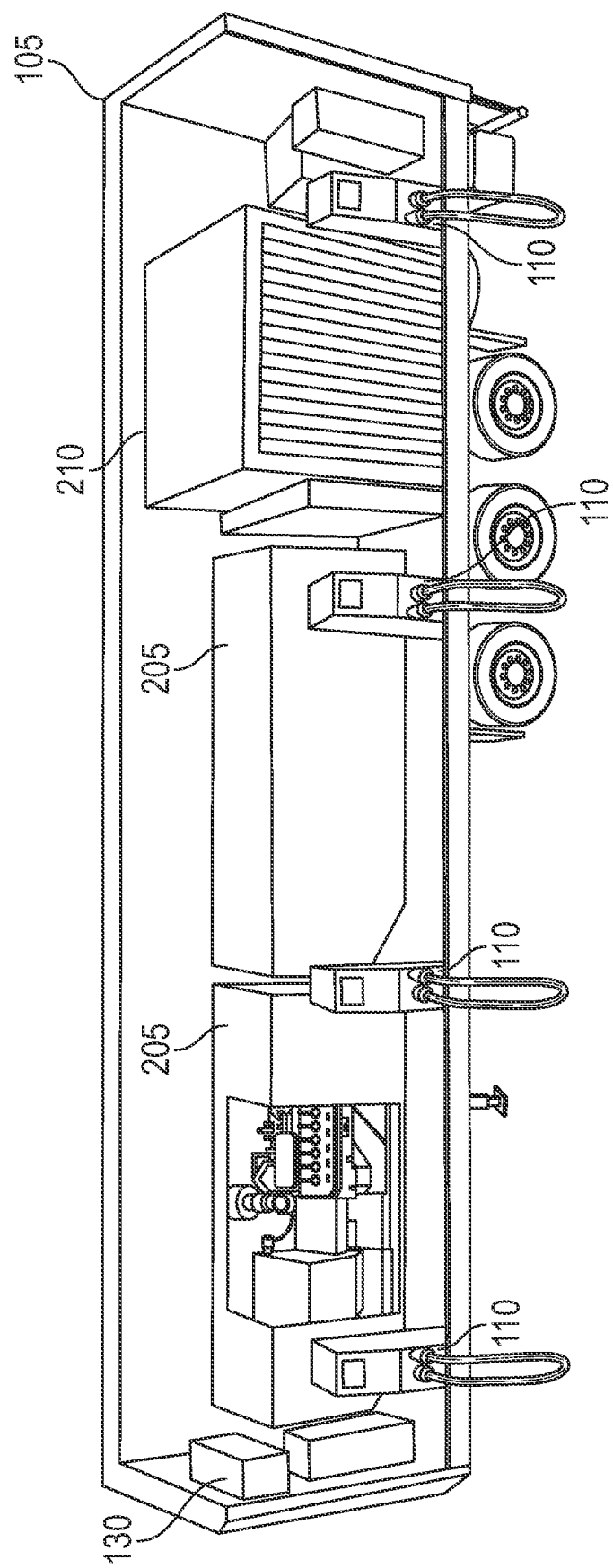
FIG. 2 includes a partial-cutaway view of the structure of FIG. 1, according to one or more aspects of the present disclosure.

FIG. 1 illustrates one embodiment of a portable microgrid system 100 that includes a structure 105 capable of transporting or moving a number of charging stations 110. As illustrated in FIG. 1, the system 100 includes or is connected to a number of energy resources. For example, the system 100 includes a solar array 115 and is configured to connect with a power grid 120 or multi-MW generating device. In this embodiment, the system 100 includes fuel storage 125, such as a propone tank, and a controller 130 that is capable of communicating with a communication device 135 via a network 140. FIG. 2 includes a partial-cutaway view of the structure 105 of the portable microgrid system 100 and shows additional elements, such one or more engine-driven generators 205 and a battery and inverter system 210.

Generally, the system 100 receives and/or generates electricity via the number of resources and, depending on the amount of energy received and/or generated, creates an energy mix (e.g., 25% received via the power grid, 25% generated via engine-driven generators, and 50% generated via the solar array). Because each energy resource has different costs and environmental impacts, different energy mixes will result in different costs, environmental impacts, etc. In some embodiments, the system 100 controls the energy mix to meet a preferred cost, preferred environmental impact, etc. Cost and environmental impact are just examples of target parameters that the system 100 receives. Other target or preferred parameters may be a carbon intensity value, an energy efficiency value, or a resiliency value. Using the target parameter(s), the system 100 can alter the energy mix so that it meets the target parameter(s). In some examples, the target parameter(s) can be received from a user that wants to buy electricity to, for example, charge his or her electric vehicle via one of the charging stations 110. FIG. 1 illustrates one example in which the target parameters are displayed on the communication device 135. In this example, the target parameters include "A. Lowest Energy Cost" and "B. Lowest Carbon intensity Value" and the user would select either A or B. The system 100, in response, would create an energy mix that satisfied the selected target parameter for the user to purchase.

Example Components of the Portable Microgrid System 100

Regarding the structure 105, the structure 105 may be or include a moveable trailer, mobile shipping container, a portion of a vehicle such as a truck, etc. In other embodiments, however, the structure 105 may be a semi-permanent or permanent installation, such as when the structure 105 is connected "directly" or "behind-the-meter" to a permanently located energy resource such as a wind or solar farm. In that embodiment, the system 100 is a microgrid system 100. As used herein, "behind-the-meter" refers to receiving electricity from an energy resource prior to the electricity being stepped up for transmission to the grid.

Regarding the charging stations 110, in some embodiments, the charging stations 110 are Level 3 EV charging stations. In one or more embodiments, the system 100 includes six charging stations, but the number of charging stations can be as low as one charging station and can also be greater than six. In some embodiments, the charging stations 110 are Level 3 DC Fast Chargers. In one or more embodiments, in operation, the portable microgrid system 100 has the charge capacity to charge 6 vehicles simultaneously, providing a 30 kWh charge, which is about 90 miles in range in approximately 20 minutes in each vehicle. In some embodiments, any Level 3 charging system can be integrated in the portable microgrid system 100. In some embodiments, another Level charging station can be used (e.g., Level 2 chargers). In some embodiments, the charging stations 110 are capable of supporting other three-phase and single-phase loads (e.g., for emergency preparedness needs). In one or more embodiments, the charging stations 110 can be scaled up or down for multiple charges to fit the need and/or application. The charging stations 110 may be powered by one or more energy resource. Generally, the charging stations 110 are configured to be connected a plurality of charging loads. In some embodiments, the charging loads may include an electric vehicle. In other embodiments, the charging loads may include banks of electric devices, such as mobile phones, battery packs, personal computers, or tablets. In further embodiments, the charging load may be a combination of both electric vehicles and banks of electric devices, but are not limited to either. For example, the charging loads may be associated with semi-permanent housing, temporary medical aid, temporary communication stations, etc. making it an extremely valuable and potentially lifesaving asset.

Regarding the solar array 115, the solar array 115 illustrated in FIG. 1 is canopy mounted and coupled to the top of the structure 105 of the portable microgrid system 100. In one or more embodiments, the solar array 115 is a 5 kW solar array mounted on a roof of the structure 105. However, in other embodiments, the solar array 115 may be a permanent installation such as a solar farm that the portable microgrid system 100 is connected to behind-the-meter or before the power generated by the solar farm is stepped up for transmission to the local power grid. In some embodiments, the solar array 115 is ground-mounted, such as a temporary, movable installation located separate from the structure 105. In some embodiments, the solar array 115 is integrated with battery energy storage for optimum energy harvesting. In one or more embodiments, the solar array 115 is expandable to fit various applications and may be eligible for grants and credits.

Regarding the power grid 120 or multi-MW generating device, in some embodiments the power grid 120 refers to a Wide Area Synchronous Grid (also known as an Interconnection), and is a regional scale or greater electric power grid that that operates at a synchronized frequency and is electrically tied together during normal system conditions. Generally, the power grid 120 includes: (i) generation stations that produce electrical power at large scales for delivery through the grid, (ii) a point of interconnection ("POI") where the generation station equipment connects to the transmission equipment and where generation-side metering occurs, (iii) at least one step up transformer located between the generation station and the transmission equipment (in some instances at the POI) for increasing the generated power's voltage for transmission (iv) high voltage transmission lines that carry the grid power from the generation stations to demand centers, and (v) distribution networks that carry grid power to individual customers.

Regarding the fuel storage 125, the fuel storage 125 stores fuel for the one or more engine-driven generators 205. In some embodiments, the fuel storage 125 includes a 2,000-gallon propane tank. In some embodiments, the fuel storage 125 is 46" diameter, 55"×288", and 3400 lbs. In one or more embodiments, the fuel storage 125 may hold 1585 gallons of LPG. In one or more embodiments, 3.3 gallons produces 30 kWh charge, as such 480 total galloons produces 30 kWh charges per tank and may produce 14,409 total kWh per tank.

Regarding the controller 130, in some embodiments the controller 130 is a stand-alone controller that can be integrated into other charging or electrical systems than those described or contemplated herein. In one or more embodiments, the controller 130 includes software, such as predictive modeling software, and hardware, such as physical controllers that are capable of communicating and controlling inputs from the number of energy resources. In some embodiments, the controller 130 of the portable microgrid system 100 enables an effective path towards enabling energy transition away from carbon-based energy to renewable energy. In some embodiments, the portable microgrid system 100 and its controller 130 provide the necessary baseload power required for reliability and power-on-demand while integrating and effectively utilizing renewable energy resources. The system 100 and its controller 130 provide unique advantages and capabilities that solve difficult challenges to our energy infrastructure and can be an enabling technology for advancing the adoption of EVs. The portable microgrid system 100 (as one example of a microgrid) can provide EV and other charging in remote areas and serve as a rapid response, and deployable resource supporting the evacuation and management of disaster areas, as noted above.

Regarding the communication device 135, the communication device 135 may be a computer system, including without limitation, personal computers, iPads, smartphones, and cell phones. While the communication device 135 is illustrated as separate from a vehicle in the FIG. 1, in some embodiments the communication device 135 is integrated into the vehicle. Generally, the user can use the communication device 135 to make a charge request, which is communicated to the controller 130. In some embodiments, the charge request includes the user's preference for the parameters of the charge or at least one target parameter. The parameters of the charge may include things like minimizing the energy cost or ensuring that the energy mix of the charge has the lowest possible carbon intensity value. In some embodiments, the communication device 135 is a cell phone with an application download thereon or capable of displaying a website. In some embodiments, the charge request is sent and received via an internet or network 140 that is in communication with the portable microgrid system 100. The charge request is received and executed via the controller 130.

Regarding the network 140, the network 140 includes the Internet, one or more local area networks, one or more wide area networks, one or more cellular networks, one or more wireless networks, one or more voice networks, one or more data networks, one or more communication systems, and/or any combination thereof. In some embodiments, the network 140 also includes WIFI, Bluetooth, and Long-Term Evolution ("LTE") or other wireless broadband communication technology.

Regarding the one or more engine-drive generators 205, in some embodiments the one or more engine-driven generators 205 are fuel powered and receive fuel from the fuel storage 125. In one embodiment, the one or more engine-driven generators 205 may be two 130 kW propane-fueled generators receiving propane from fuel storage 125. In other example embodiments, only one propane-fueled generator may be used. In one or more example embodiments, the portable microgrid system 100 uses two 120 kW generators that operate on natural gas, CNG, RNG, or LPG in a fuel switching configuration. Fuel switching capability allows the system 100 to detect and switch between the various gaseous fuels and operate normally without human intervention, depending on which fuel is available. Using two generators improves efficiency and adds redundancy and resiliency. The same generator configuration(s) could be deployed using gasoline, diesel, or JP8-fueled generators. Onboard power distribution and overload protection may provide the energy for up to six DC fast chargers, 400 amps of AC power, and dual six-station cell charging kiosks.

Regarding the hybrid battery and inverter system 210, the battery and inverter system 210 may be used to distribute power to the charging stations 110. In some embodiments, the hybrid battery and inverter system 210 includes two separate components: a battery 210a (illustrated in FIG. 3) for the storage of energy and an inverter 210b (illustrated in FIG. 3) for regulating the flow of the electrical power in and out of the hybrid battery and inverter system 210. In some embodiments, the hybrid battery and inverter system 210 may be the Moser HybridGen system sold by Moser Energy Systems, which combines battery and inverter technology with a generator into a unique power system with some key advantages such as allowing for solar energy integration, reducing greenhouse gas emissions by up to 50%, reducing fuel consumption by 40%, providing significantly enhanced power delivery at low and high output levels, and eligibility for grants and credits. One embodiment of the HybridGen system is described in U.S. patent application Ser. No. 17/839,042 and/or U.S. patent application Ser. No. 16/779,949, the entireties of which are hereby incorporated by reference. In other embodiments, continuous-duty generators such as gas-fired generators capable of operating on natural gas, oil field flare gas, and propane and generators capable of switching between fuels while running and providing power can be integrated with HybridGen battery energy storage. In one or more embodiments, the generator integrated with HybridGen battery energy storage may be the one or more generators 205. In some embodiments, the continuous-duty generators are EPA certified and produce 70 kW-400 kW output. In some embodiments, the battery/inverter system has a hybrid generator of its own that delivers up to 240 KW supplemental power. In some embodiments, the 240 kW Battery and Inverter System is the BISON, available via Moser Energy Systems.

In an example embodiment, the portable microgrid system 100 is a mobile microgrid that utilizes low-emissions, engine-driven generators, battery energy storage, and photovoltaic (PV) panels to power multiple level 3 DC chargers, three-phase and single-phase AC power, and low voltage DC power effectively and efficiently for charging of cell phones and other devices. The system 100 is self-contained, mobile, rapidly deployable, and can be safely operated as an unmanned resource.

In another example embodiment, the portable microgrid system 100 operates independent of the power grid 120 and incorporates ultra-clean, gas-powered generators, battery energy storage, and renewable energy is an effective way. In some embodiments, the portable microgrid system 100 operates solely on clean, renewable energy sources. The portable microgrid system 100 can also provide invaluable, and potentially life-saving services in the event of a significant disaster event when existing charging resources are overwhelmed with heavy traffic flow during evacuations and/or if the grid supporting those charging resources is unavailable.

Combining the hybrid power aspect with conventional internal combustion engines (e.g., one or more generators 205) provides multiple cost and capability advantages to both the routine charging of EV's as well as disaster planning organizations. Specifically, these benefits include: (1) providing level 3 EV charging in remote areas where grid connection is unavailable or unreliable; (2) providing level 3 EV charging in rural areas to increase adoption of electric vehicles; (3) avoiding long and costly interconnection queues and utility upgrades to expedite EV adoption, (4) better environmental stewardship relative to the transmission grid in many areas of the U.S.; and (5) providing level 3 EV charging as well as remote supply of power during the evacuation of large population areas.

Example Schematic Diagrams Associated with the Portable Microgrid System

Figure 3:
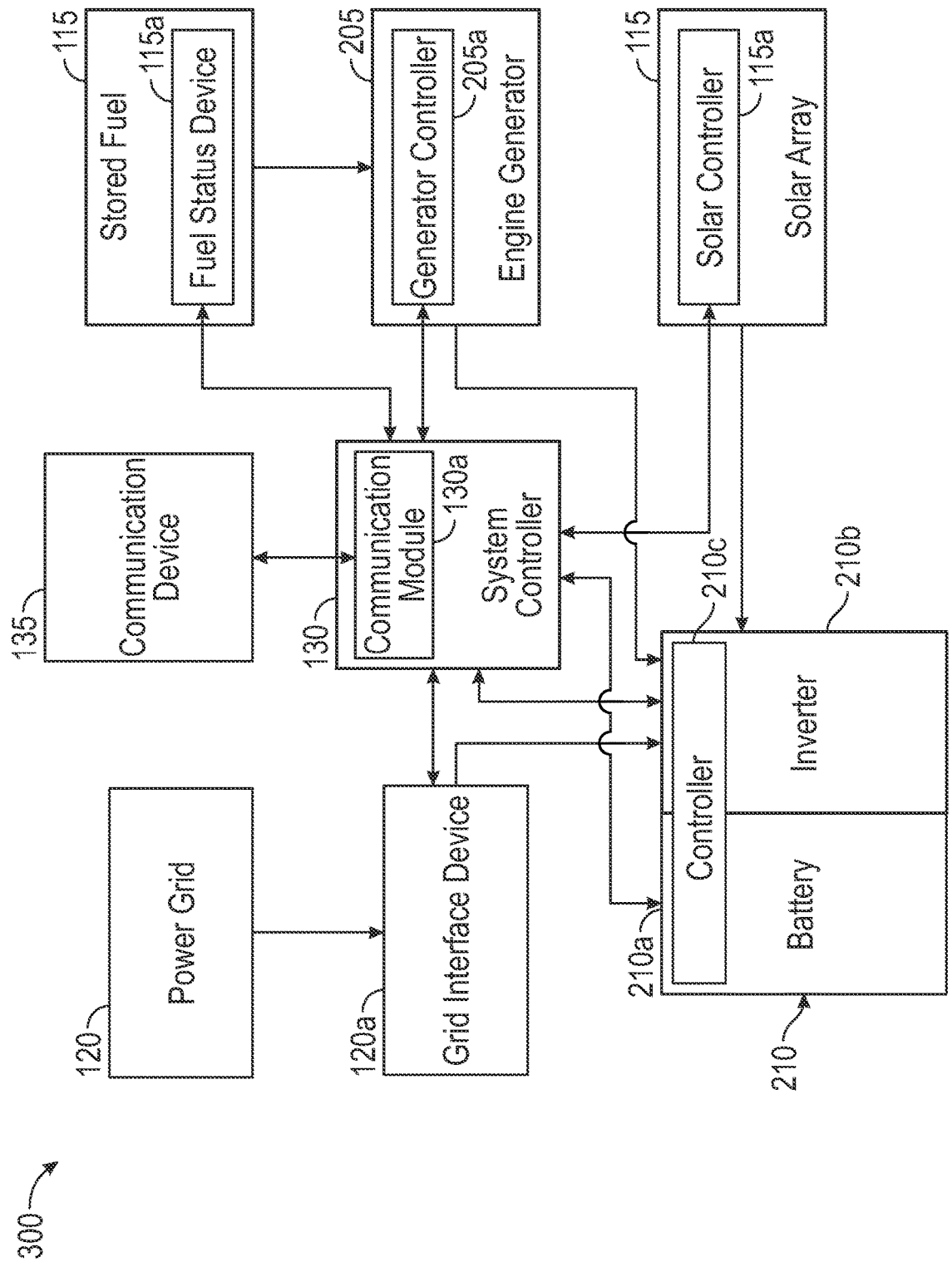
FIG. 3 is a schematic illustration of a portion of the system and the communication device of FIG. 1, according to one or more aspects of the present disclosure.

FIG. 3 provides a schematic diagram 300 of one embodiment of the portable microgrid system 100 and the communication device 135. In the schematic diagram 300, the controller or system controller 130 is connected to and in communication with the various energy resource of the portable microgrid system 100 via resource controllers (e.g., solar array controller 115*a*, generator controller 205*a*, battery and inverter controller 210*c*); a fuel status device 125*a* associated with the fuel storage 125 and/or the engine-driven generator(s) 205; and a grid interface device 120*a* associated with the power grid 120.

In some embodiments, the portable microgrid system 100 is connected to the power grid 120 via the grid interface device 120*a*. The grid interface device 120*a* is configured to selectively allow power from the power grid 120 to be received by the portable microgrid system 100 to either supplement the other energy resources or to aid in the creation of a desired energy mix.

In some embodiments, and as illustrated in the schematic diagram 300, the system controller 130 is in communication with and may give commands to the resource controllers and/or interface devices (e.g., the solar array controller 115*a*, the battery and inverter controller 210*c*, the generator controller 205*a*, and the grid interface device 120*a*) associated with the various resources of the portable microgrid system 100. Additionally, in some embodiments, the system controller 130 is connected to and in communication with a fuel status device 125*a* associated with the fuel storage 125 and/or the generator(s) 205, allowing the system controller 130 to control the flow of fuel into the generator(s) 205. The system controller 130 may include or otherwise be associated with a communication module 130*a* to (i) enable receipt of charge requests or to communicate certain information to the communication device(s) 135 of users and/or (ii) receive certain real-time information and data regarding availability, pricing, and other factors associated with energy from the local grid or any of the other energy resource inputs into the portable microgrid system 100.

In an example embodiment, the system controller 130 controls multiple energy resources and system devices. The system controller 130 generally commands, regulates, monitors, and controls transmission of power to the charging stations 110 so that a vehicle or device can charge in an efficient and reliable manner based on resource availability, energy cost, and environmental factors. The system controller 130 selects and manages the resources via the device 120*a* and the controllers 115*a*, 205*a*, and 210*c* to optimize the energy output to the charging stations 110 to achieve specific requirements in resiliency, energy efficiency, cost, and environmental impact. In some embodiments, the charge is received from the battery 210*a*, which receives charge from the other energy sources based on the commands and regulation of system controller 130. The system controller 130 commands devices generator controller 205*a*, solar controller 115*a*, and grid interface device 120*a* to maintain a desired energy cost, carbon intensity, energy efficiency, and resiliency. Through the resource controllers (e.g., generator controller 205*a*, solar controller 115*a*, battery and inverter controller 210*c*, and grid interface device 120*a*) system controller 130 further commands generator(s) 205, the solar array 115, the output inverter 210*b*, and the battery energy storage 210*a*. In some embodiments, the system controller 130 may use input data from sensing devices including, for example, the fuel status device 125*a*, current sensing devices positioned to sense current from the solar array 115, the engine-driven generators 205, and the power grid 120, and a device integrated into or associated with battery 210*a* to calculate energy cost and carbon intensity per kWh. In some embodiments, the system controller 130 communicates via the communication module 130*a* to input and/or output consumer pricing and carbon intensity based on the energy inputs.

In some embodiments, the system controller 130 provides automation, system operation, supervisory control, and data acquisition (SCADA). The system controller 130 may be configured to identify each power generation resource, such as the engine-driven generator(s) 205, the solar array 115, the grid power 120, and the like, as well as to manage the charging and discharging of the battery 210*a* and to totalize and control energy produced by or received from each generating resource, as disclosed and described in U.S. patent application Ser. No. 17/839,042 and/or U.S. patent application Ser. No. 16/779,949.

In an example embodiment, the total power output and/or potential total power output/availability of the number of resources is reported to the system controller 130. For example, the total power produced by the solar array 115, the total power available from the power grid 120, and the total power available in the battery 210*a* may be reported to and monitored by the system controller 130.

Figure 4:
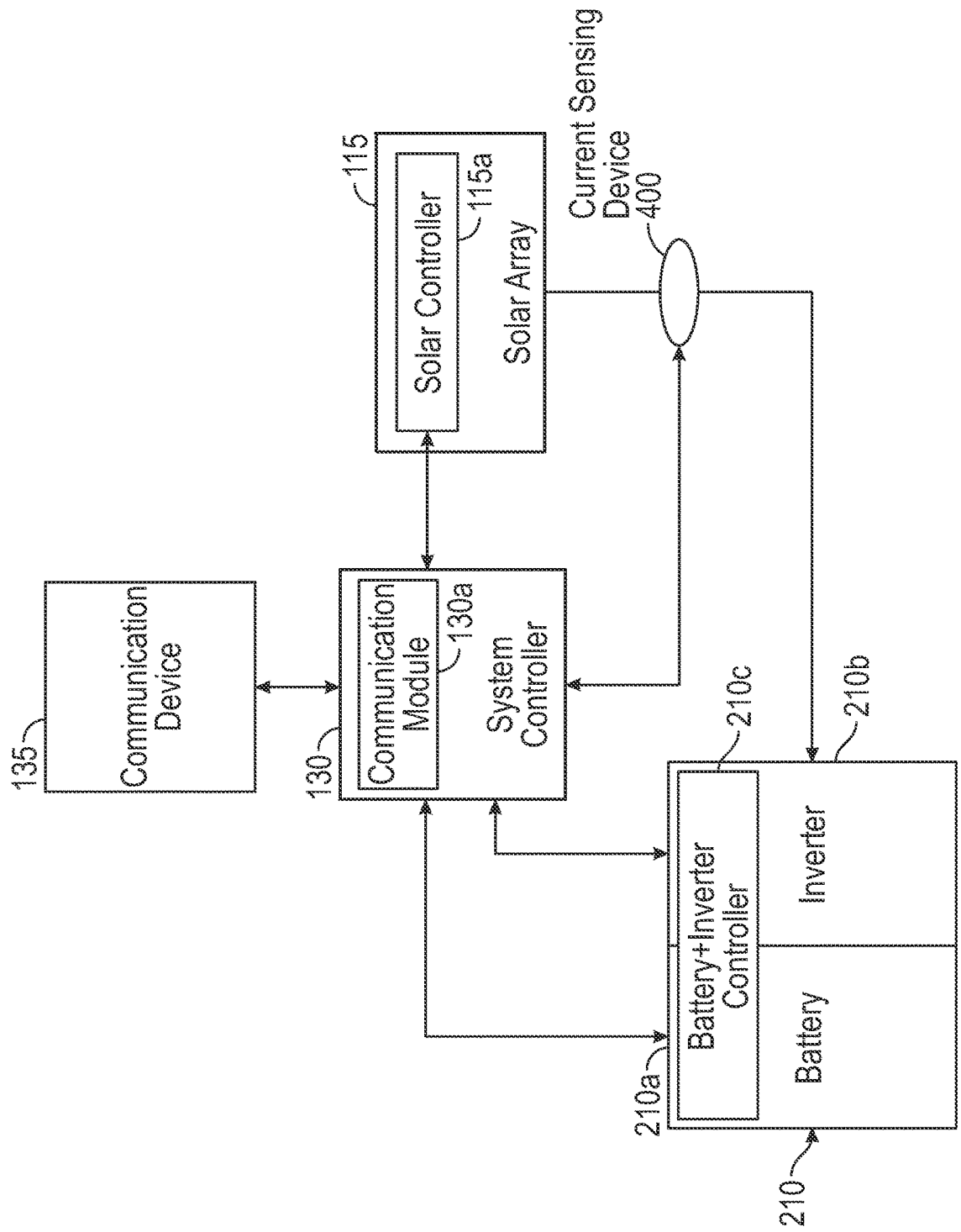
FIG. 4 is a schematic illustration of another portion of the system and the communication device of FIG. 1, according to one or more aspects of the present disclosure.

FIG. 4 illustrates a portion of the schematic diagram 300 with focus on the solar array 115. In one embodiment, the system controller 130 monitors a set of operating parameters of the solar array 115. The system controller 130 is connected to the solar controller 115*a* and a current sensing device 400. In some embodiments, the system controller 130 is configured to command the operation of the solar array 115 through the solar controller 115*a*. In some embodiments, the solar controller 115*a* is a grid-tied inverter.

The solar controller 115*a* is operably coupled to the solar array 115. The solar controller 115*a* and the current sensing device 400 are both in communication with the system controller 130. In some embodiments, the solar controller 115*a* is constantly communicating operating data about the solar array 115 to the system controller 130. In some embodiments, the current sensing device 400 measures a signal and/or the current sent from the solar controller 115*a* to the inverter 210*b* and sends the measurement to the system controller 130. In other embodiments, the solar controller 115*a* may communicate the current or amount of electrical power generated by the solar array 115 to the system controller 130.

In some embodiments, the system controller 130 calculates the carbon intensity per kWh produced by the solar array 115 and distributed by the solar controller 115*a* using data from the current sensing device 400. In some embodiments, the system controller 130 calculates the cost per kWh of using the solar array 115. In some embodiments, the system controller 130 calculates the percent of the stored and available energy produced by the solar array 115 and available to the connected charging stations 110 and ancillary loads. In some embodiments, the system controller 130 calculates the cost per kWh of the stored and available energy produced by the solar array 115 and available to the connected charging stations 110 and ancillary loads.

In some embodiments, the system controller 130 determines that the operating parameters of the solar array 115 must be adjusted. This decision may be based on a charge request from a user, a desired net profit per charge, available energy resources, or other internal or external factors. In the event that the system controller 130 determines that the operating parameters of the solar array 115 must be adjusted, the system controller 130 may control the solar controller 115*a* to adjust the operation of the solar array 115. In some embodiments, the system controller 130 controls the solar controller 115*a* via commands to adjust certain operating parameters, including, but not limited to, the direction the solar panels of the solar array 115 are facing and/or the operating voltage of a solar power system including the solar array 115 (e.g., by the solar controller 115a when it is a non-grid-tied inverter). In some embodiments, the system controller 130 communicates a desired amount of current to be produced by or received via the solar array 115 to the current sensing device 400 which may relay such information to the solar controller 115a so that adjustments may be made to the operating parameters of the solar array 115 accordingly.

Figure 5:
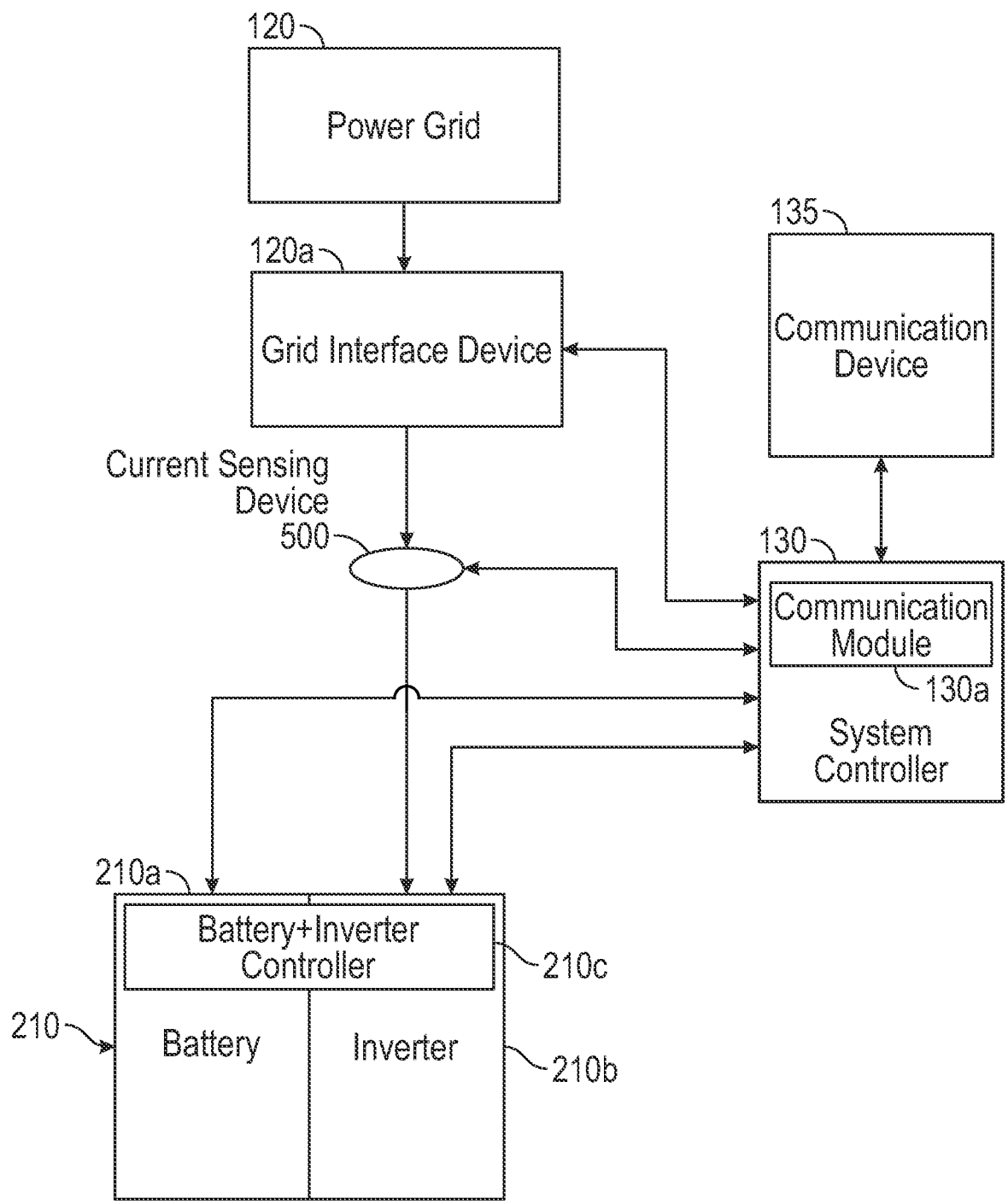
FIG. 5 is a schematic illustration of yet another portion of the system and the communication device of FIG. 1, according to one or more aspects of the present disclosure.

FIG. 5 illustrates a portion of the schematic diagram 300 with focus on the power grid 120. In one embodiment, the system controller 130 monitors a set of operating parameters associated with the local power grid 120. In some embodiments, the set of monitored operating parameters include a present status of the power grid 120, a real time price of receiving electricity from the power grid 120, and an amount of power being presently received from the power grid 120. As illustrated, the system controller 130 is connected to grid interface device 120a and a current sensing device 500. In some embodiments, the system controller 130 is configured to command the operation of the grid interface device 120a, through which power from the local commercial power grid 120 may be received into the portable microgrid system 100.

In some embodiments, the grid interface device 120a reports the grid status and real-time pricing on the connected grid 120 to the system controller 130. The grid interface device 120a may also send a signal and/or current to inverter 210b. Current sensing device 500 measures the signal and/or current from the grid interface device 120a to inverter 210b and the measured signal and/or current received from the grid 120 through gird interface device 120a may be sent to the system controller 130.

In some embodiments, the system controller 130 calculates the carbon intensity per kWh produced by the grid 120 using the current indicated by the current sensing device 500. In some embodiments, the system controller 130 calculates the cost per kWh using the information provided by the grid interface device 120a. In some embodiments, the system controller 130 calculates the percent of the stored and available energy produced by the grid 120 and received via the grid interface device 120a and available to the connected charging stations 110 and ancillary loads. In some embodiments, the system controller 130 calculates the cost per kWh of the stored and available energy produced by the grid 120 and received via the grid interface device 120a and available to the connected charging stations 110 and ancillary loads.

In some embodiments, the system controller 130 determines that the amount of power being received into the portable microgrid system 100 from the power grid 120 via the grid interface device 120a must be adjusted. This decision may be based on a charge request from a user, a desired net profit per charge, available energy resources, or other internal or external factors. In the event that system controller 130 determines that the amount of power being received from the power grid 120 must be adjusted, the system controller 130 may control the grid interface device 120a to adjust the amount of power being received from power grid 120 into the portable microgrid system 100. In some embodiments, the system controller 130 controls the grid interface device 120a via commands to adjust the amount of power allowed to be received from power grid 120. In some embodiments, the system controller 130 communicates a desired amount of current to be received from the power gird 120 via the grid interface device 120a to the current sensing device 500, which may relay such information to the grid interface device 120a, so that adjustments may be made to the amount of power received via the grid interface device 120a accordingly.

Figure 6:
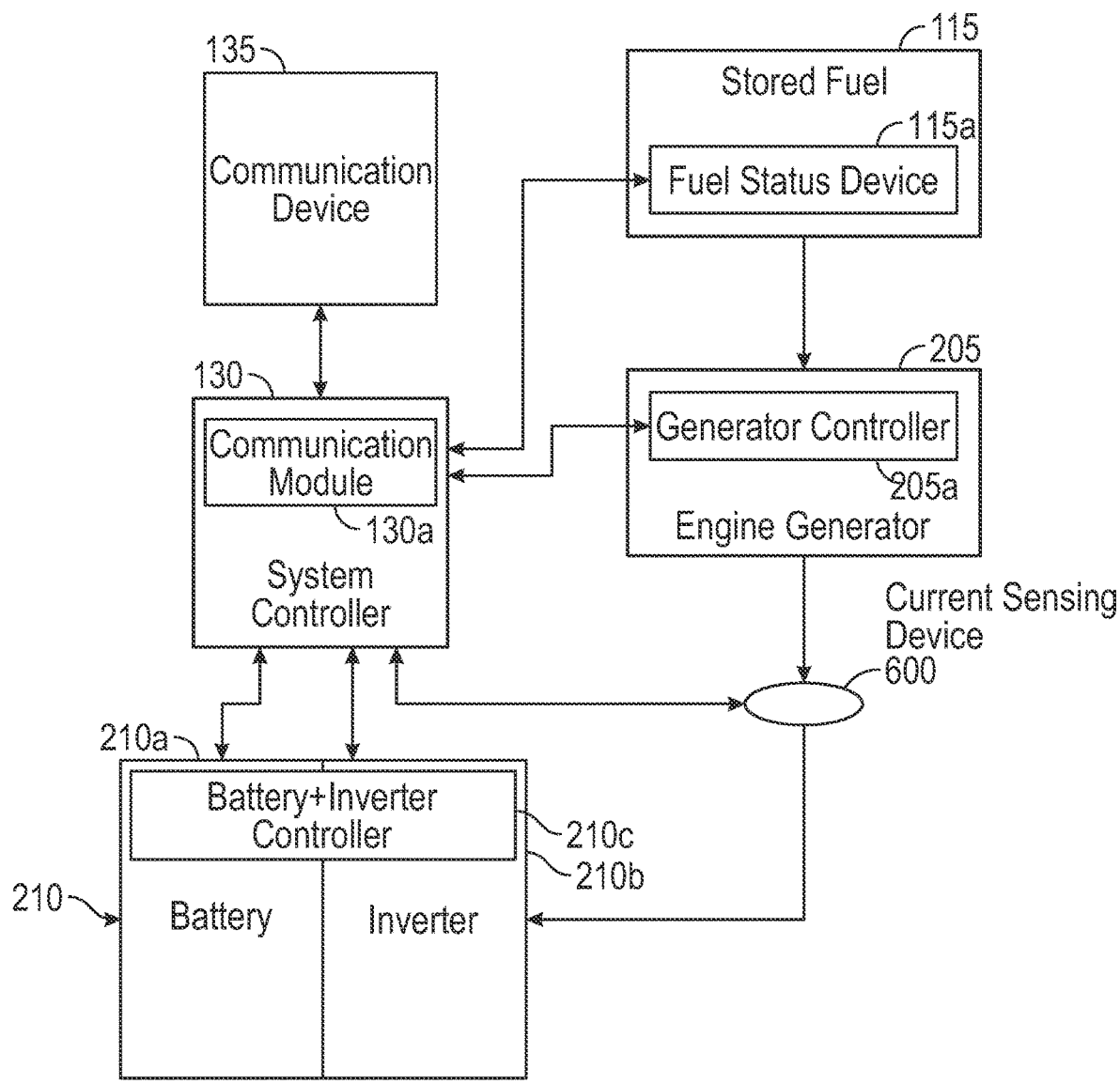
FIG. 6 is a schematic illustration of yet another portion of the system and the communication device of FIG. 1, according to one or more aspects of the present disclosure.

FIG. 6 illustrates a portion of the schematic diagram 300 with focus on the generator(s) 205. In one embodiment, the system controller 130 monitors a set of operating parameters of the generator(s) 205. As illustrated, the system controller 130 is connected to fuel status device 125a, the generator controller 205a, and a current sensing device 600. In some embodiments, the system controller 130 is configured to command the operation of the generator(s) 205 through the generator controller 205a.

In some embodiments, the fuel status device 125a monitors fuel status as fuel of the one or more type(s) of fuel is sent to one of the generator(s) 205. The fuel status device 125a is in communication with the system controller 130 and informs the system controller 130 which fuel is being utilized. In some embodiments, the generator 205 is an engine-driven generator using a fuel switching engine that can operate on pipeline natural gas or an alternative fuel such as propane, CNG, RNG, or wellhead gas. In some embodiments, the fuel status device 125a is constantly communicating data—about the stored fuel and what type of fuel is being fed into generator(s) 205—to the system controller 130. The generator controller 205a is also in direct communication with the system controller 130. In some embodiments, the generator controller 205a is constantly communicating operating data about the generator(s) 205 to the system controller 130.

In some embodiments, the generator controller 205a sends a signal and/or current to inverter 210b, which is measured by a current sensing device 600. The current sensing device 600 is in communication with the system controller 130 such that the current sensing device 600 measures the signal and/or current sent from the generator controller 205a to the inverter 210b and sends output based on the measured signal and/or current to the system controller 130. In other embodiments, the generator controller 205a may communicate the current or amount of electrical power generated by the generator(s) 205 to the system controller 130.

In some embodiments, the system controller 130 calculates the carbon intensity per kWh produced by the generator(s) 205 using the indicated fuel and current produced. In some embodiments, the system controller 130 calculates the cost per kWh using the fuel source indicated. In some embodiments, the system controller 130 calculates the percent of the stored and available energy produced by the generator(s) 205 and available to the connected charging stations 110 and ancillary loads. In some embodiments, the system controller 130 calculates the cost per kWh of the stored and available energy produced by the generator(s) 205 and available to the connected charging stations 110 and ancillary loads.

In some embodiments, the system controller 130 determines that the operating parameters of the generator(s) 205 must be adjusted. This decision may be based on a charge request from a user, a desired net profit per charge, available energy resources, or other internal or external factors. In the event that the system controller 130 determines that the operating parameters of the generator(s) 205 must be adjusted, the system controller 130 may control the generator controller 205a to adjust the operation of the generator(s) 205. In some embodiments, the system controller 130 controls the generator controller 205a via commands to adjust certain operating parameters, including, but not limited to, the type of fuel to be used, the amount of fuel to be used, and operating times. In some embodiments, the system controller 130 communicates information about the type and amount of fuel to be used by the generators(s) 205 to the generator controller 205a and the generator controller 205a relays such information to the fuel status device 125a which controls the type and amount of fuel to be delivered to the generator(s) 205. In some embodiments, the system controller 130 communicates a desired amount of current to be generated by the generator(s) 205 to the current sensing device 600, which may relay such information to the generator controller 205a so that adjustments may be made to the operating parameters of the generator(s) 205 accordingly.

Figure 7:
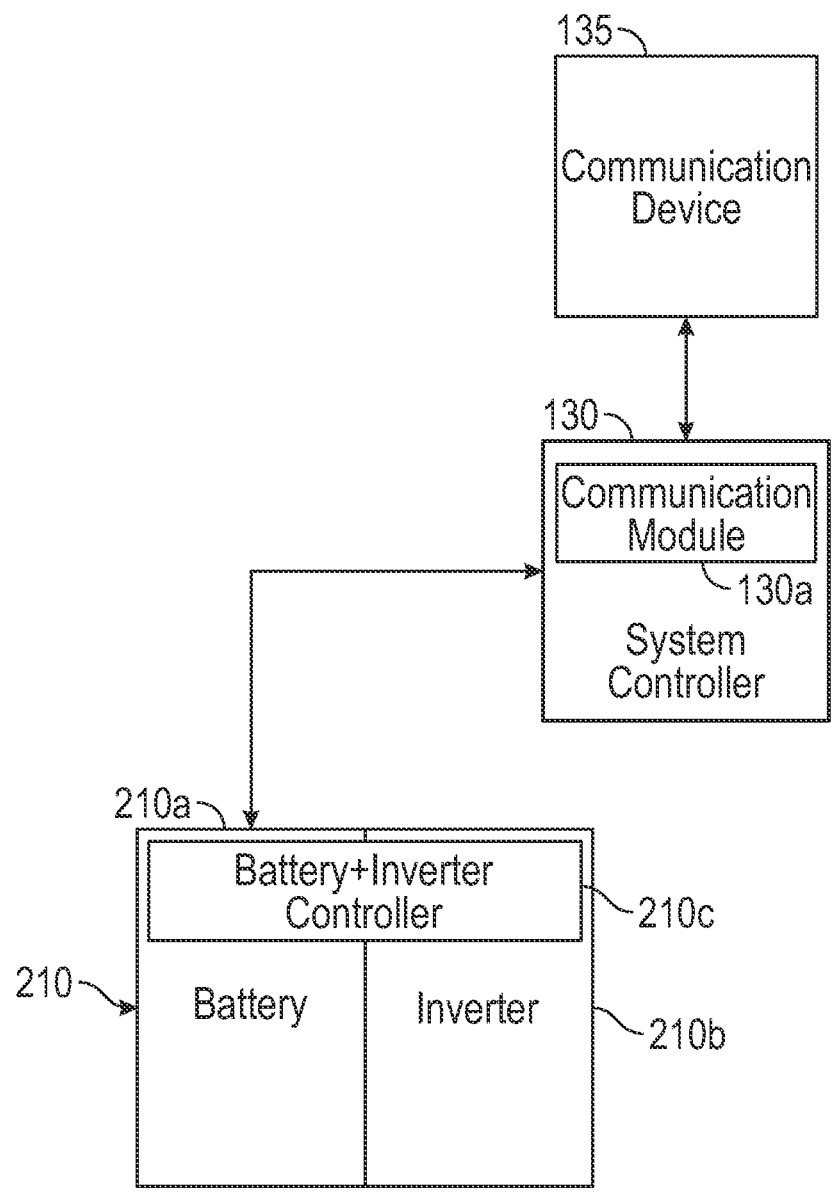
FIG. 7 is a schematic illustration of yet another portion of the system and the communication device of FIG. 1, according to one or more aspects of the present disclosure.

FIG. 7 illustrates a portion of the schematic diagram 300 with focus on the hybrid battery and inverter system 210. In one embodiment, the system controller 130 monitors a set of operating parameters of the battery 210a. In some embodiments, the set of monitored operating parameters include an amount of energy available in the battery 210a, the types of energy resources being used to charge the battery 210a, and a rate of charge or discharge of the battery 210a. The system controller 130 is connected and in communication with the battery 210a. In some embodiments, the system controller 130 is configured to command the operation of the battery 210a directly. In other embodiments, there is an additional battery controller such as the battery and inverter controller 210c that is in direct communication with the system controller 130 and relays commands and signal therefrom to the battery 210a.

In some embodiments, the system controller 130 calculates the carbon intensity per kWh that is received from the battery 210a using the types, respective amounts, and other data associated with the energy resources used to charge the battery 210a. In some embodiments, the system controller 130 calculates the cost per kWh of using power from the battery 210a based on the mix of energy resources used to charge the battery 210a. In some embodiments, the system controller 130 calculates the percent of the total available energy that is stored the battery 210a and available to the connected charging stations 110 and ancillary loads. In some embodiments, the system controller 130 calculates the cost per kWh of the available energy stored by the battery 210a and available to the connected charging stations 110 and ancillary loads.

In some embodiments, the system controller 130 determines that the operating parameters of the battery 210a must be adjusted. This decision may be based on a charge request from a user, a desired net profit per charge, available energy resources, or other internal or external factors. In the event that system controller 130 determines that the operating parameters of battery 210a must be adjusted, the system controller 130 may directly adjust the operation of battery 210a. In some embodiments, system controller 130 controls the operation of battery 210a via commands to adjust certain operating parameters, including, but not limited to, the rate of discharge from the battery 210a. In some embodiments, the system controller 130 communicates the desired operating parameters of battery 210a to the battery controller 210c which may relay such information to the battery 210a so that adjustments may be made to the operating parameters of battery 210a accordingly. In other embodiments, the controller 130 makes the adjustments to the operating parameters of the battery 210a directly instead of relaying the instructions to the battery controller 210c.

Figure 8:
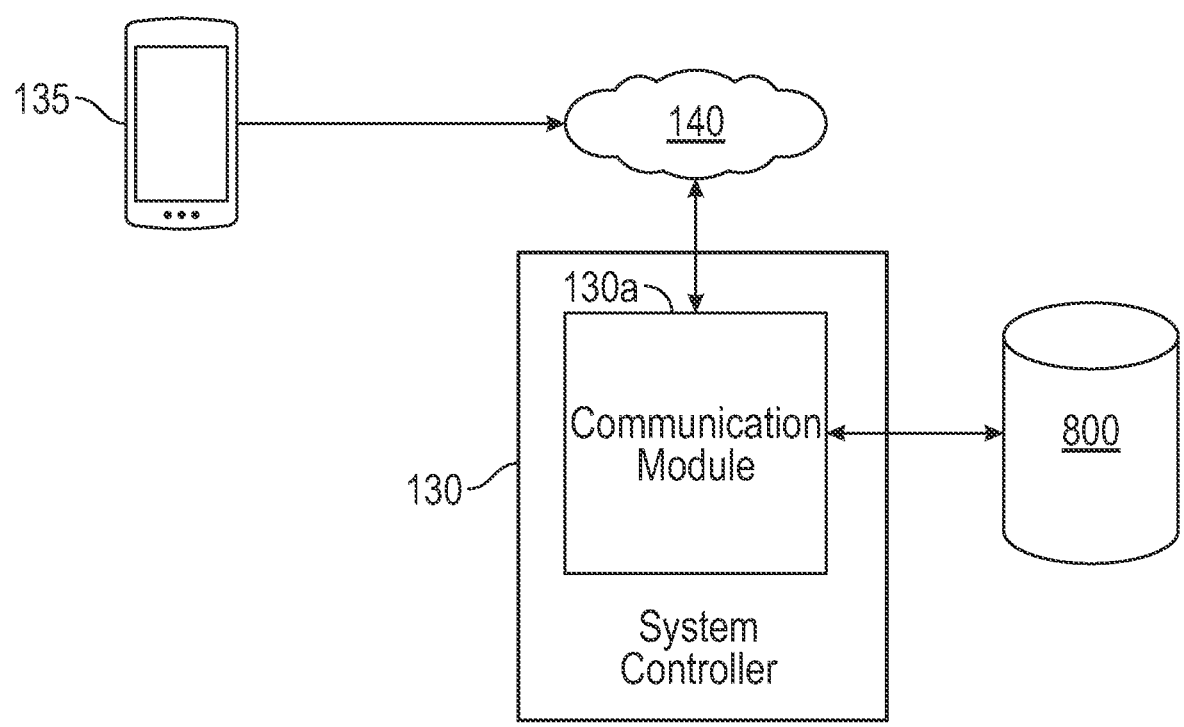
FIG. 8 is a schematic illustration of yet another portion of the system and the communication device of FIG. 1, according to one or more aspects of the present disclosure.

FIG. 8 illustrates a portion of the schematic diagram 300 with focus on the communication module 130a and communication device 135. In one embodiment, the communication module 130a is connected to and in communication with the network 140, enabling communication with the communication device 135. The communication device 135 is not required in some embodiments. For example, in some embodiments, the user interacts with the communication module 130a via a touchscreen or GUI associated with one of the charging stations 110. In one or more embodiments, the system controller 130 broadcasts the total cost per charge to the consumer and the carbon intensity of the charge via the communication module 130a to the user. In one or more embodiments, the communication module 130a uses web-based communications; mobile charging applications; or an online charger home page to communicate with the user. In some embodiments, each resource controller (e.g., the generator controller 205a, the solar controller 115a, and the grid interface device 120a) is able to "advertise" the available charging rate to the consumer (e.g., gas/propane, solar, and utility respectively) via the system controller 130 and/or communication module 130a. The system controller 130 ensures that the appropriate pricing is applied to the available charges based on charging costs, which eliminates unfair pricing calculated on the highest possible (worst case) power generation cost. For example, the portable microgrid system 100, when the majority or all of the energy is provided by solar resources (e.g., the solar array 115), may be able to offer charges at the lowest cost. Further, the portable microgrid system 100 that has solar as the majority of energy balance indicates an under-utilized asset. The low charging rate will drive users to utilize the solar resource and increase consumer traffic, stimulating the use of the portable microgrid system 100 with the lowest pricing and "cleanest" carbon intensity.

Carbon intensity per charge can be calculated and compared to the prevailing grid 120 to show the clean advantage per charge. In some embodiments, this advantage may be communicated to the user or potential users of the portable microgrid system 100.

In some embodiments, the system controller 130 considers the expected return on investment (ROI) per charge on each charging station 110. In some situations, the portable microgrid system 100 may be privately owned and can be configured to use a specific rate of return that aligns with the owner's commercial strategy. For example, cost comparison on sources of energy for a 30-KwH charge may be $1.80 for natural gas, $7.20 for LP (propane), $0.50 for solar, and $3.30 for utility. However, at a 40% Margin, the cost comparison on sources of energy for a 30-kWh charge may be $3.00 for natural gas, $12.00 for LP (propane), $0.83 for solar, and $5.50 for utility. In other situations, the portable microgrid system 100 may be municipal owned equipment. These municipal owned portable microgrid systems 100 may have lower cost and a lower ROI to reflect community incentives (e.g., for affordable and reliable charging resources for underserved communities).

In some embodiments, the system controller 130 is communicatively linked via wireless or wired means to the internet (e.g., the network 140) or receives input into a human machine interface (HMI) (e.g., communication module 130a) regarding the cost of commercially provided generator fuel.

In some embodiments, real time pricing of grid power is reported to the system controller 130 (time of use and peak charges may influence this cost). In some embodiments, the "energy mix" already present in portable microgrid system 100 and available for charging is used along with a programmed ROI to provide current pricing to the consumer or user. The system controller 130 is configured to calculate the cost of the stored and/or produced energy from the various resources, for example, using generator fuel cost/kWh plus O&M, solar $0 fuel cost plus O&M, and the real-time grid pricing rate (grid charging can be avoided if the peak or time of use impact is prohibitively significant). Then a user adjusted ROI is added to the per charge cost to ensure commercial viability, and the cost of energy stored plus ROI threshold equals the consumer cost per charge.

In some embodiments, the portable microgrid system 100 may present a user with options associated with the user's charge request, as illustrated in FIG. 1. For example, the user may access a mobile application or webpage with a form that presents the user with options regarding certain parameters associated with the user's charge request. For example, the options may include the type of charge requested, the anticipated amount of charge needed, the time period in which the charge will be needed, etc. In some embodiments, the user is presented with the form on a user communication device or GUI coupled to the portable microgrid system 100. In other embodiments, the user may make their selections remotely on a cell phone or other device. In one or more embodiments, this form allows the user to make a selection to optimize their charge to have the lowest cost or the lowest carbon intensity. In other embodiments, the form may allow the user to make more specific requests, such as a custom balance between the price of the charge, the carbon intensity of the charge, the energy efficiency of the charge, and/or a resiliency value of the charge. In some embodiments, the user's selection of the parameters for their charge may be coupled with a prompt to reserve a time for the charge at the charging station 110. The user's selections are communicated to the system controller 130, which then may control the various energy resource inputs of the portable microgrid system 100 to implement the user's preferences.

For example, in one or more embodiments, the system controller 130 can manipulate the energy resources to achieve the desired user preferences in three modes of operation: lowest carbon intensity, lowest cost, and a "resiliency mode" where the only consideration is providing charges regardless of cost or carbon intensity. If carbon intensity per charge is the priority, the system controller 130 would source energy first from renewable resources (e.g., the solar array 115), second from the low-emissions generator (e.g., the generator 205), and third from the grid 120. If the lowest cost per charge is the goal, then renewables first (e.g., the solar array 115), the grid 120 second (dependent on real-time pricing rates), and the generator(s) 205 last. If resiliency is the goal, renewables (e.g., the solar array 115) would be sourced first, followed by the generator(s) 205. This assumes the grid 120 is not available, thus switching the electrical power system into "resiliency mode" via the system controller 130. In some embodiments, the system controller 130 could harvest energy to achieve a specific, selected carbon intensity. In exchange, this may limit the number of charges available at a given time to allow renewable energy to charge the battery 210a or to adjust the energy mix in the portable microgrid system 100. In some embodiments, the system controller 130 can command the energy resources to control the energy cost of each charge and then calculate the per charge price to the consumer with an allowance for operating and maintenance costs, capital costs, overhead, and expected margin to achieve a favorable ROI.

The portable microgrid system 100 may also include or be configured to access a database 800 associated with the system controller 130. In some embodiments, the database 800 may be used to store historical data, including, but not limited to, historical pricing for energy from power grid 120, data related the use/efficiency of each of the energy resources of the portable microgrid system 100, and historical user selections for charge parameters. The system controller 130 may receive and use the historical user selections from the database 800 to identify trends in user selections for preferred charge parameters. These trends may be tied to a number of external factors (e.g., geographic areas, demographics, times of the year, etc.). The system controller 130 may then use the identified trends to predict future user preferred or target charge parameters. In some embodiments, the system controller 130 may then control and adjust the operating parameters of the various energy resource inputs of the portable microgrid system 100 to optimize for the predicted future user preferred charge parameters such that the portable microgrid system 100 has the proper energy resources available to fulfill future requests for charges with the preferred charge parameters.

Example Methods of Use

Figure 9:
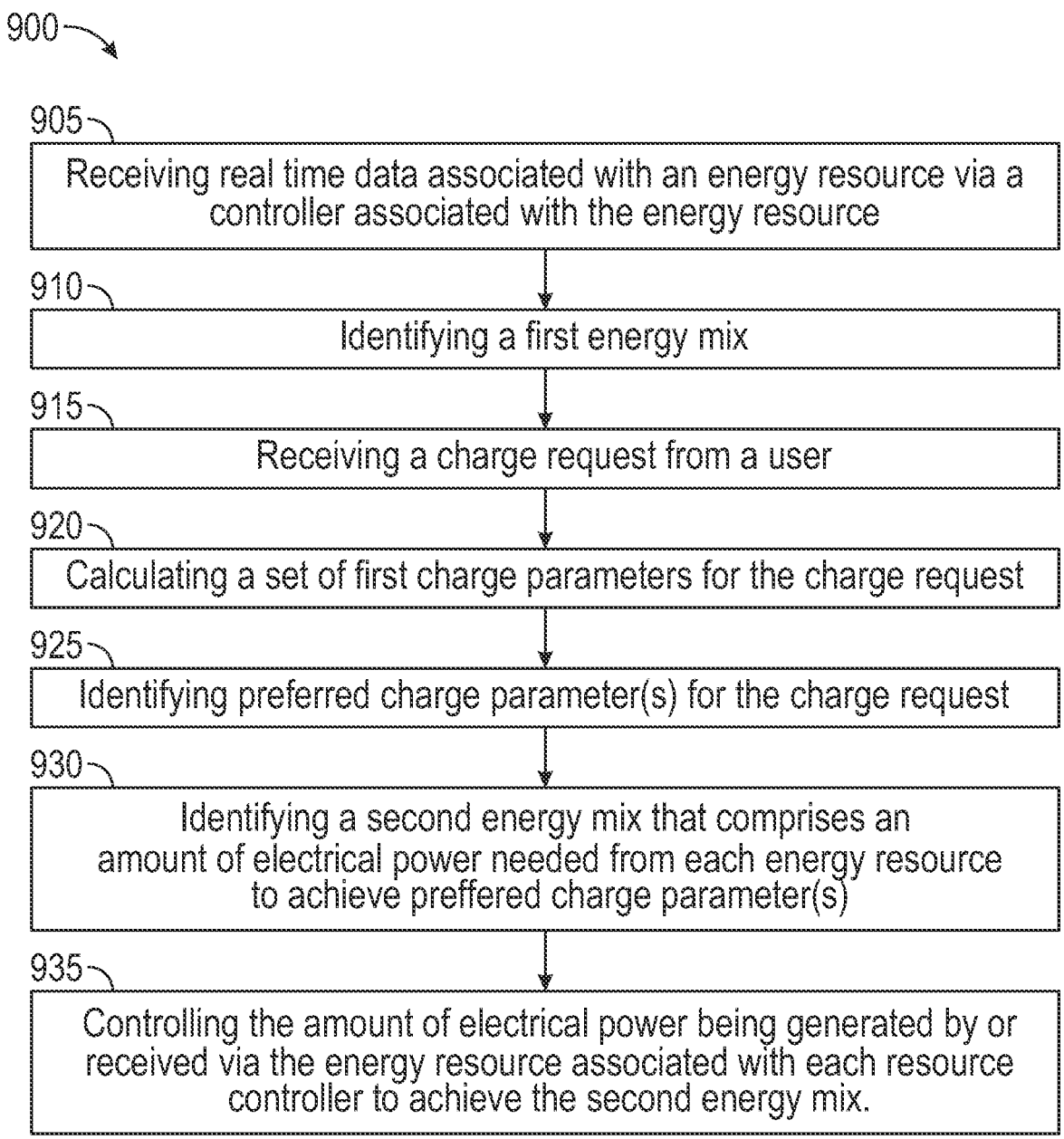
FIG. 9 is a flow chart diagram of a method according to one or more aspects of the present disclosure.

FIG. 9 is a flow chart showing an example method 900 to adjust the operation of the portable microgrid system 100 using a system controller 130. The method 900 includes receiving data associated with an energy resource via a controller associated with an energy resource input at step 905; identifying a first energy mix present in a portable microgrid system 100 at step 910; receiving a charge request from a user at step 915; calculating a set of first charge parameters for the charge request at step 920; identifying preferred charge parameter(s) for the charge request at step 925; identifying a second energy mix based on the preferred charge parameter(s) at step 930; and controlling the energy resources of the portable microgrid system 100 to achieve the second energy mix at step 935. It is understood that additional steps can be provided before, during, and after the steps of method 900, and that some of the steps described can be replaced or eliminated for other implementations of the method 900.

During step 905, the portable microgrid system 100 receives real time data associated with an energy resource via a controller associated with an energy resource input. In some embodiments, the controller associated with an energy resource input is one of the controllers 115a, 205a, 120a, or 210c. In other embodiments, there is a single controller associated with all of the energy resources of the portable microgrid system 100. In one or more embodiments, the real time data is received and available for processing by the system controller 130. The system controller 130 may receive the data from the resource controllers (e.g., 115a, 205a, 120a, 210c) via a direct link, but in other embodiments the data associated with an energy resource is communicated via the communication module 130a and/or the current sensing devices (e.g., 400, 500, 600). In some embodiments, the system controller 130 is constantly monitoring and receiving data associated with the energy resources. In some other embodiments, data is received by the system controller 130 at predetermined intervals.

During the step 910, the portable microgrid system 100 identifies a first energy mix that is currently being produced and/or stored by the portable microgrid system 100. The first energy mix is the specific combination of energy resources used to produce the power distributed or stored by the portable microgrid system 100. For example, the first energy mix may be determined to be 20% solar power, 15% grid power, and 65% power from generators. The first energy mix may be identified by determining the amount of current and/or power being presently produced by each of the energy resource inputs of portable microgrid system 100, summing the current and/or power being produced by each of the energy resource inputs to determine a total current and/or power produced by portable microgrid system 100, and allocating percentages of the total current and/or power produced by each of the energy resource inputs. In some embodiments, the first energy mix may also be identified by determining the charge of battery 210a and the percentages of the charge of battery 210a that may be attributed to each of the energy resources.

During the step 915, the portable microgrid system 100 receives a charge request from a user. In some embodiments, the charge request is received by a communication module 130a associated with the system controller 130. In some embodiments, the charge request may comprise a type of device/load to be charged (e.g., an EV or bank of devices). In some embodiments, the charge request may be for a specific amount of power (e.g., a set amount of kWh to be distributed). In some embodiments, the charge request may be a reservation for a future charge. In some embodiments, the charge request may be coupled with specific preferred charge parameters such as a price for the charge or instructions to minimize the carbon intensity of the energy mix used to fulfill the charge request.

During step 920, the portable microgrid system 100 calculates a set of first charge parameters for the charge request. In one or more embodiments, the calculations are carried out by the system controller 130. The first set of charge parameters is calculated based on certain parameters of the charge request (e.g., the quantity of charge requested in kWh) and the first energy mix that is currently available for distribution in the portable microgrid system 100. In some embodiments, the first set of charge parameters includes an energy cost (usually per kWh), a carbon intensity value, an energy efficiency value, and a resiliency value. The energy efficiency value may be determined by the percentage of the total available energy resources that would be used to complete the charge compared to the amount of energy currently produced and/or stored in portable microgrid system 100 that would need to be generated (e.g., by generators) or received via the local power grid to fulfill the charge request. The resiliency value may be determined based on the reliance on grid resources for the charge, wherein less reliance on grid resources will mean a higher resiliency value for the charge.

During the step 925, the portable microgrid system 100 identifies preferred charge parameter(s) for the charge request. In one or more embodiments, the system controller 130 identifies the preferred charge parameter(s) based on one or more of a number of factors, including user input, available resources, charging demand, a proposed ROI per charge, etc. In some embodiments, the preferred charge parameter(s) includes any one or more of a preferred energy cost, a preferred carbon intensity, a preferred energy efficiency value, and a preferred resiliency value.

FIG. 10 illustrates example sub-steps of the step 925 when the preferred charge parameter(s) is identified to ensure a certain ROI on the charge request. The method 900 provides for receiving a preferred net profit per charge at step 925a; determining a total price to charge the user for completing the charge request at step 925b; and calculating the preferred energy cost for completing the charge request at step 925c.

During the step 925a, the portable microgrid system 100 receives a preferred net profit per charge. In some embodiments, the preferred net profit per charge is predetermined and programmed into the system controller 130. In other embodiments, the system controller 130 may be able to pull and analyze real time energy pricing data and energy resource availability to calculate a preferred net profit per charge for a specific charge request. In some embodiments, the preferred net profit per charge may be a monetary amount (e.g., $0.05 per kWh or $2 per charge). In other embodiments, the preferred net profit per charge may be a percentage of the total price charged to the consumer for a charge (e.g., 5% per charge).

During the step 925b, the portable microgrid system 100 determines a total price to charge to the user for completing the user's charge request. In some embodiments, this determination is made by the system controller 130. The total price to charge to the consumer is based on factors including, at least, parameters of the charge request and available energy resources and the real time pricing thereof.

During the step 925c, the portable microgrid system 100 calculates a preferred total energy cost for completing the charge request based on the preferred net profit per charge and the total price to charge to the user for completing the charge request. In some embodiments, this calculation is made by the system controller 130. It is understood that, in one or more embodiments, the steps 925b and 925c may be reversed in order, where it is first calculated what the total energy cost is to complete the charge request and then a total price to charge to the user is determined based on the preferred net profit per charge and the total energy cost to complete the charge request.

FIG. 11 illustrates example sub-steps of the step 925 when the preferred charge parameter(s) is identified using a set of optimized parameters for the charge request as selected by the user. The method provides for identifying optimized charge parameter(s) for the charge request at step 925x; displaying one or more of the optimized charge parameters to the user at step 925y; and receiving a selection for the preferred charge parameter from the user comprising at least one of the optimized charge parameters of the set of optimized charge parameters at step 925z.

During the step 925x, the portable microgrid system 100 identifies a set of optimized charge parameters for the charge request. In some embodiments, it is the system controller 130 that identifies the set of optimized charge parameters. The set of optimized charge parameters includes at least one of an optimized energy cost and/or an optimized carbon intensity. In some embodiments, the optimized energy cost is the lowest cost per kWh that can be supplied to complete the user's charge request, presumably minimizing the cost to the user for the charge. In some embodiments, the optimized carbon intensity is the lowest possible carbon intensity that can be achieved using the mix of currently available energy resources to complete the user's charge request. A charge with an optimized carbon intensity may be considered to be the most environmentally conscious of the charging options.

During the step 925y, the portable microgrid system 100 displays one or more of the optimized charge parameters to the user for the user to make a selection of which optimized parameter(s) the user prefers. In some embodiments, the optimized charge parameters are displayed to the user on a personal device, such as a through a mobile application or a webpage on a cell phone or laptop computer. In other embodiments, the optimized charge parameters are displayed to the user on a device or display that is part of portable microgrid system 100 (e.g., a touchscreen associated with one of the charging stations 110). In some embodiments, it is the system controller 130 that communicates the set of optimized charge parameters to the appropriate device for display to the user.

In other embodiments, the system controller uses the communication module 130a to communicate the optimized charge parameters to the appropriate device for display to the user. In some embodiments, the values associated with the optimized charge parameters are displayed directly to the user (e.g., "The lowest cost per kWh for this charge is $0.08"). In other embodiments, the optimized parameters may be presented to the user in other formats, such as a question like "Would you prefer to minimize the cost or environmental impact of your charge?" Once presented with the optimized parameters on a display, the user may be prompted to make a selection of which optimized parameter the user prefers to dictate the parameters of their charge.

During the step 925z, the portable microgrid system 100 receives a selection of one of the optimized charge parameters and the selected parameters is the preferred charge parameter(s). The selected optimized charge parameters will dictate the remaining preferred charge parameters. For example, if the user chooses to minimize the cost of the charge, the target carbon intensity of the charge will be adjusted accordingly to accommodate the lowest cost possible regardless of the energy mix necessary to achieve it.

In some embodiments, the user may select to optimize multiple charge parameters (e.g., optimize cost and carbon intensity). In such cases, the method may further comprise the system controller 130 determining the best combination of optimized charge parameters possible based on the available energy resources. This may mean that the individual optimized parameters are no longer the most optimized that they can be. For example, if a system were to solely optimize for cost it may be able to deliver a charge at $0.02 per kWh and if the same system was solely optimized for carbon intensity it may be able to deliver a charge at 10 g of $CO_2$ per kWh. However, if the same system were optimized for both cost and carbon intensity concurrently it may only be able to deliver a charge at $0.04 per kWh and 20 g of $CO_2$ per kWh. The options presented to the user and/or selectable by the user are not limited to optimized energy mixes (e.g., minimum cost, minim carbon intensity).

Referring back to FIG. 9, during the step 930, the portable microgrid system 100 identifies a second energy mix that comprises an amount of electrical power needed from each energy resource to achieve the preferred charge parameter(s). In some embodiments, it is the system controller 130 that identifies the second energy mix. To identify the second energy mix, the system will analyze the preferred charge parameter(s) and determine, based on the preferred charge parameter(s) and the available energy sources (including the respective quantities thereof), an energy mix that achieves the preferred charge parameter(s). For example, the system may have identified preferred charge parameter(s) that optimizes for the lowest carbon intensity. In such a case, the system may determine an energy mix that is predominantly renewables (e.g., solar energy from the solar array 115). In another example, the system may have identified preferred charge parameter(s) that optimizes resiliency. In such a case, the system may determine an energy mix that receives no power from the grid 120. In some embodiments, the system may also base the determination of the second energy mix on the currently available first energy mix. For example, the system may identify a set of preferred charge parameters optimizing for the highest energy efficiency. In such a case, the system may determine an energy mix that uses predominately power already stored in battery 210a (i.e., the first energy mix) and will minimize power received from the grid 120.

During the step 935, the portable microgrid system 100 controls the amount of electrical power being generated by or received via each energy resource to achieve the second energy mix. In some embodiments, the system controller 130 controls the generation and/or receipt of power from each energy resource via communication with the resource controller associated with each respective energy resource. In some embodiments, the system controller 130 commands the resource controllers associated with the energy resource inputs to adjust certain operating parameters affecting the generation of electrical power (e.g., by the generator(s) 205) or the amount of electrical power that may be received into the system from the energy resource input (e.g., by the battery 210a or grid interface device 120a). By way of an illustrative example, the system may initially have a first energy mix of 20% renewable power, 15% grid power, and 65% power from generators. The system 100 may then identify a new set of charge parameters which seeks to decrease the carbon intensity and increase the resiliency of a requested charge. In such a case, the system may determine a second energy mix based on the new set of charge parameters which includes 80% renewable power and 20% power from generators. The system may then adjust the operating parameters of the individual energy resource inputs to increase the proportion of the energy mix from renewables from 20% to 80%, turn off the receipt of power from the grid, and decrease the proportion of the energy mix from generators from 65% to 20%.

In some embodiments, once the portable microgrid system 100 is producing and/or able to supply power using the preferred second energy mix, the portable microgrid system 100 will supply power to fulfill the charge request through the charging stations 110 or another auxiliary power output.

Example Improvements Associated with the Portable Microgrid System

The portable microgrid system 100 and related methods described herein result in multiple improvements to one or more of the technical fields of: mobile charging, microgrids, EV Controllers, EV charging, and modeling.

The portable microgrid system 100 and related methods provide many advantages in the technological fields of EV and mobile charging through: (1) improved modeling capabilities, (2) providing an alternate to grid connected EV charging, (3) improving rural EV charging, (4) reducing delays experienced in interconnection queues, (5) improving environmental attributes relative to the utility grid, and (6) impacting emergency planning, each of which will be discussed more below.

First, the use with and/or integration of the Moser DISASTERTECH® platform, or similar platforms, for modeling associated with the portable microgrid system 100 will enable unmatched capabilities to predict natural events and model scenarios involving the needs, and ultimately, the optimal positioning of power generation and other critical services.

Second, the North American electric grid is becoming less stable and more unreliable. The electric grid is becoming increasingly strained by the abundance of intermittent resources. Interconnection, even when available, takes too long and is costly. The ability to provide charging for EV's and other devices without dependence on the suitability of the local transmission grid is one advantage of the portable microgrid system 100.

Third, manufacturers of farm equipment are quickly moving to implement EV technologies into their products. Unfortunately, the investment in, and construction of, rural charging infrastructure is lagging far behind. The portable microgrid system 100 proposes to demonstrate the utility of mobile, Level 3 charging in rural areas with the potential to be a shared asset among members of the farming community. Besides providing Level 3 charging, the portable microgrid system 100, in some embodiments, also has the capability of charging 6-10 vehicles per hour depending on the type of vehicle.

Fourth, the proliferation of wind and solar generation projects has created unprecedented costs and delays in the traditional utility interconnection study and approval process. In fact, there was an estimated 1,000 GW of generation and an estimated 427 GW of storage capacity as of the end of 2021; over 930 GW of zero-carbon generating capacity is currently seeking transmission access; solar and battery storage is nearly 85% of new capacity entering the queues in 2021; and much of this proposed capacity will not ultimately be built—only 23% of the projects seeking connection from 2000 to 2016 have subsequently been built and this number is declining. Proposed fossil fuel generation is on the decline. Interconnection wait times are on the rise: the typical duration from connection request to commercial operation increased from ~2.1 years for projects built in 2000-2010 to ~3.7 years for those built in 2011-2021. The portable microgrid system 100 does not require interconnection to the transmission grid.

Fifth, much of the energy produced and distributed over the U.S. transmission grid is still produced by carbon-based assets. In some embodiments, when fueled with RNG or propane, along with emissions control system, the portable microgrid system 100 can provide charging to EV's and other devices with lower emissions than the comparable energy supplied from the grid. For example, emissions from a car with a typical internal combustion engine produces 411 grams of $CO_2$ per mile, which equates to 6.8 tons of $CO_2$ per year (at 15,000 miles/year); whereas, in some embodiments, a typical portable microgrid system 100 may produce around 308 grams of $CO_2$/kWh or 107 grams of $CO_2$ per mile (at 3 miles/kWh). Therefore, in some embodiments, the typical portable microgrid system 100 is able to save 248 grams of $CO_2$ per mile, which equates to 3,720,000 grams or 4.1 tons of $CO_2$ per year, which is about the same as 170 mature trees can absorb in a year. Charging with the portable microgrid system 100 is more environmentally friendly (cleaner) than using just an internal combustion engine. In some embodiments, the portable microgrid system 100 produces an average of 0.68 pounds/kWh, 0.23 pounds/kWh less than natural gas power plants, and 1.53 pounds/kWh less than coal-fired power plants. A natural gas-fired power plant produces 0.91 pounds of $CO_2$/kWh, 3 EV miles per kWh, and 0.303 pounds of $CO_2$ per EV mile, which is 4,550 pounds of $CO_2$ per year. Whereas, in some embodiments, the portable microgrid system 100 produces 0.68 pounds of $CO_2$/kWh, 3 EV miles per kWh, and 0.226 pounds of $CO_2$ per EV mile, which equates to 3,400 pounds of $CO_2$ per year. Thus, in some embodiments, the portable microgrid system 100 outputs 1,150 less pounds of $CO_2$ per year than the natural gas-fired power plant. In some embodiments, the portable microgrid system 100 also meets CA AQMD requirements. In one or more embodiments, the portable microgrid system 100 is fueled by natural gas or propane and has the ability to also integrate renewables.

Sixth, in the event of natural disasters requiring the evacuation of large populations, the significant increase in the number of EV's utilizing the primary high-traffic evacuation routes will undoubtedly overwhelm the current charging infrastructure. It is possible that the grid will be unavailable and incapable of providing sufficient charging capability during such an evacuation. The portable microgrid system 100 will provide Level 3 charging quickly, reliably, and with the ability to relocate to accommodate the uncertainties that natural disasters create. In some embodiments, the portable microgrid system 100 is mobile such as carried by a truck, semi, or the like. In other embodiments, the portable microgrid system 100 is stationary. In some embodiments, the portable microgrid system 100 is serviced and maintained by one company. In many cases, these evacuation routes are near grid-tied solar power plants that are reduced to a stranded asset during a catastrophic grid failure. In some embodiments, the portable microgrid system 100 harvests this energy during the outage event with the appropriate interconnection and switchgear design. In other embodiments, the portable microgrid system 100 harvests this energy behind-the-meter. In some embodiments, the portable microgrid system 100 also provides energy for cellular telephones as well as critical infrastructure facilities such as aid stations and food storage facilities in addition to EV charging.

The portable microgrid system 100 is extremely flexible, and its capabilities will enable emergency charging services for vehicles as well as other battery-operated devices along evacuation paths that may remain fluid as the crisis evolves. By using multiple energy resources, the ability to have direct control over the cost of energy (in some cases for each individual charge) by manipulating and commanding the connected resources, and by sensing and gathering actual data from the resources rather than assuming grid conditions are all additional advantages of the portable microgrid system 100 and related methods.

Additionally, the system controller 130 provides further advantages as it calculates pricing per charge using ROI thresholds provided by the user, ensures fair pricing and protecting commercial viability by accounting for variable costs of several different sources of energy used to create the energy available for each charge, and provides a means to inform consumers on not only the price of the available charging resources, but also the environmental impact. In some embodiments, the system controller 130 makes "decisions" based on resiliency, pricing, and carbon intensity, and controls the energy resources to precisely measure the energy mix composing the charge of the battery and the charge of the actual EV. For example, and when the portable microgrid system 100 is connected to the utility grid, the system controller 130 may identify a strike price for energy received via the utility grid and change the source of energy based on the price being above or below the strike price. Additionally, the portable microgrid system 100 and related methods in some embodiments eliminates charging via the utility grid during peak demand periods to eliminate peak charges.

The system 100 and method 900 identify a new, preferred energy mix to achieve the set of preferred parameters and use the system controller 130 to command resource controllers associated with the different energy resources to vary the amount of electrical power generated, received, and/or used from that energy resource to create the preferred energy mix. In some embodiments, the set of preferred parameters is determined by the user who makes the charge request. In such instances, the user may have control over the energy mix that is used to complete their individual charge request and may prioritize the parameters that are most important to the user.

A big challenge inhibiting greater adoption of EVs is the availability and reliability of the charging infrastructure. This is particularly true in the case of rural and underserved communities where the grid infrastructure is unavailable or insufficient to afford the community the charging infrastructure that larger metropolitan areas take for granted. The portable microgrid system 100 will benefit these and other communities by providing an alternative to grid-connected chargers that is more efficient, more reliable, and cleaner than the grid alternative. An additional benefit to stakeholders and the communities involved is the ability, in one or more embodiments of the present disclosure, to relocate the portable microgrid system 100. This may be very important during early adoption of the technology when the EV traffic patterns and other charging needs are not yet known. The portable microgrid system 100 may also allow for seasonal or event-driven traffic variability and provides a means to help determine the optimal location of permanent charging facilities during the evaluation process. A permanent location may include a national park, a landmark, remote travel plazas, truck stops, areas with grid congestion or reliability issues, or the like. The portable microgrid system 100 may be brought to a location for a music festival, entertainment event, conferences, or as mentioned for disaster relief. These same communities will also benefit from the energy security provided by the portable microgrid system 100 in the event of a natural disaster.

With the proper advance warning and planning, the portable microgrid system 100 could be deployed to areas impacted, or expected to be impacted, by intense weather events or other disasters and follow the flow of the evacuation traffic during the event.

Further, conventional or previous systems had many problems that are solved by the portable microgrid system 100 and related methods described herein.

First, conventional EV chargers are permanent and are not mobile. The portable microgrid system 100 may be configured to be both movable (mobile) and permanent.

Second, conventional EV chargers are only capable of using one energy resource or ineffectually using multiple resources. The portable microgrid system 100 is configured to efficiently and effectively utilize multiple energy resources, both individually and/or simultaneously.

Third, the previous systems do not have direct control over the cost of energy through the ability to manipulate each of the connected energy resources. The portable microgrid system 100 is configured so that the energy produced or received from each resource may be adjusted, in some cases in real time.

Fourth, the conventional models assume grid conditions rather than gathering actual data. The portable microgrid system 100 is configured to constantly monitor gird conditions and various operating parameters of the other energy resource inputs into the system 100.

Figure 12:
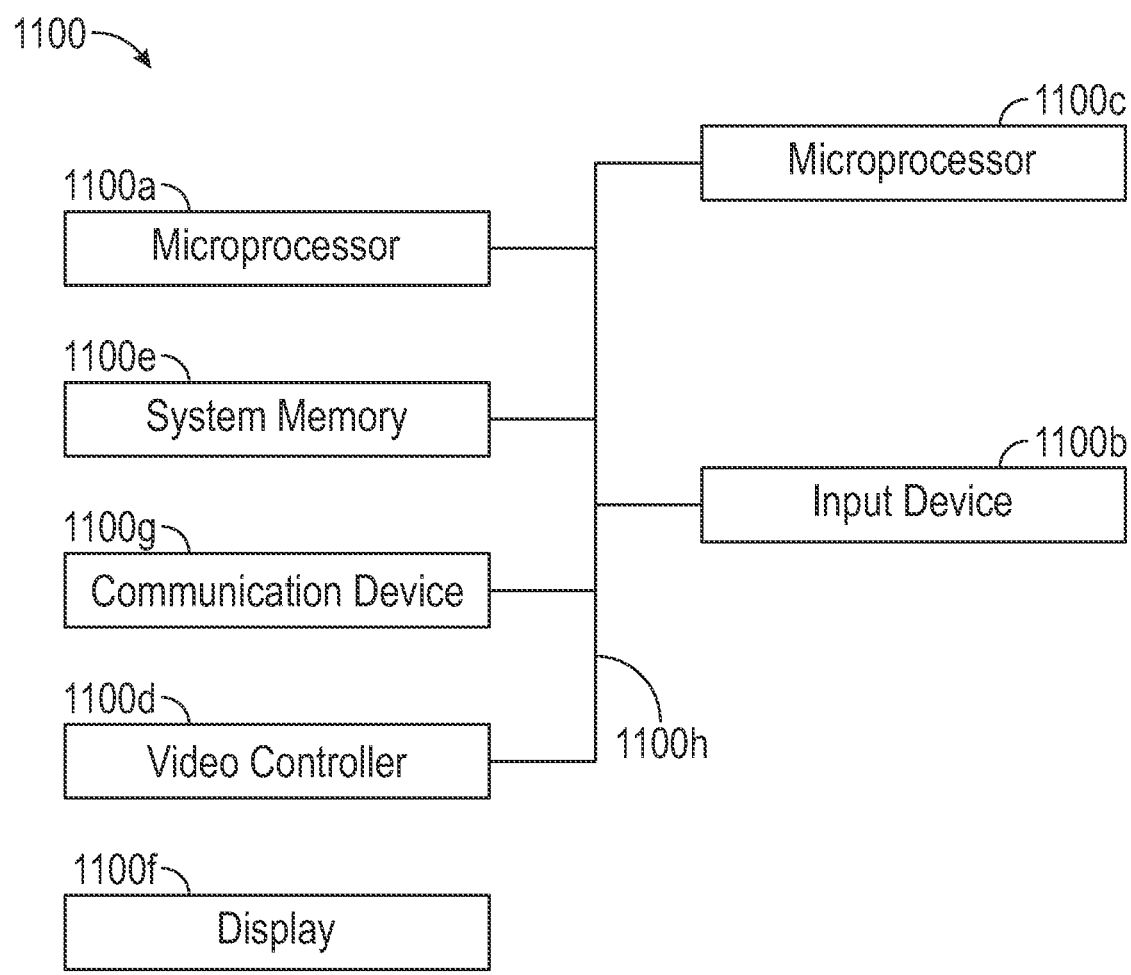
FIG. 12 is a diagrammatic illustration of a node for implementing one or more example embodiments of the present disclosure, according to an example embodiment.

In an example embodiment, as illustrated in FIG. 12 with continuing reference to FIGS. 1-11, an illustrative node 1100 for implementing one or more of the example embodiments described above and/or illustrated in FIGS. 1-8 is depicted. The illustrative node 1100 includes a microprocessor 1100a, an input device 1100b, a storage device 1100c, a video surface control system 1100d, a system memory 1100e, a display 1100f, and a communication device 1100g all interconnected by one or more buses 1100h. In several example embodiments, the storage device 1100c may include a floppy drive, hard drive, CD-ROM, optical drive, any other form of storage device and/or any combination thereof. In several example embodiments, the storage device 1100c may include, and/or be capable of receiving, a floppy disk, CD-ROM, DVD-ROM, or any other form of computer-readable medium that may contain executable instructions. In several example embodiments, the communication device 1100g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones.

In several example embodiments, one or more of the components of the systems described above and/or illustrated in FIGS. 1-11 include at least the illustrative node 1100 and/or components thereof, and/or one or more nodes that are substantially similar to the illustrative node 1100 and/or components thereof. In several example embodiments, one or more of the above-described components of the illustrative node 1100 and/or the example embodiments described above and/or illustrated in FIGS. 1-11 include respective pluralities of same components.

In several example embodiments, one or more of the applications, systems, and application programs described above and/or illustrated in FIGS. 1-11 include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1100a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

The present disclosure introduced a method for controlling, a plurality of energy resources of an electrical power system to create a preferred energy mix, comprising: calculating a first energy mix using a system controller, comprising: receiving, by the system controller, real time data via at least one resource controller associated with an energy resource, wherein the energy resource is one of the plurality of energy resource, wherein the data received by the system controller comprises an amount of electrical power being generated by or received via the energy resource, wherein each energy resource sources energy from a different type of energy resource, wherein the different types of energy resources and the amount of electrical power being generated by each energy resource associated with the different types of energy resources make up a first energy mix of the electrical power system; and identifying, based on the real time data received, the first energy mix of the electrical power system; calculating, based on the first energy mix of the electrical power system, a set of first charge parameters comprising: a first energy cost, a first carbon intensity value, a first energy efficiency value, and a first resiliency value; identifying preferred charge parameter(s) for a charge request, wherein the preferred charge parameter(s) comprises at least one of: a preferred energy cost associated with the charge request, a preferred carbon intensity value associated with the charge request, a preferred energy efficiency value associated with the charge request, or a preferred resiliency value associated with the charge request; identifying, using the system controller, a second energy mix that comprises an amount of electrical power needed from each energy resource input to achieve the preferred charge parameter(s); wherein the second energy mix is the preferred energy mix; and controlling, by the system controller, the amount of electrical power being generated by or received via the energy resource associated with each resource controller to achieve the preferred energy mix. In one embodiment, the charge request is received from a user, wherein the charge request is associated with a charge of an electric vehicle; and wherein identifying the preferred charge parameter(s) for the charge request comprises: identifying a set of optimized charge parameters for the charge request comprising: an optimized energy cost, and an optimized carbon intensity value; displaying, for selection, one or more of the optimized charge parameter(s) to the user; and receiving a selection of one of the optimized charge parameters, wherein the selected optimized charge parameters is the preferred charge parameter(s). In one embodiment, the method also includes storing the selected optimized charge parameter; identifying, based on the stored selected optimized charge parameter, a trend in user selections; predicting future preferred charge parameter(s) based on the identified trends; and optimizing placement of the electrical power system and the types of energy resources available to fulfill charge requests with the predicted future preferred charge parameter(s). In one embodiment, identifying the set of preferred charge parameter(s) for the charge request comprises: receiving a preferred net profit per charge; determining a total price to charge for completing the charge request; and calculating the preferred energy cost based on the preferred net profit per charge and the total price to charge for completing the charge request. In one embodiment, different types of energy resources comprise one or more of: solar power, the electric power grid, battery power, an engine driven generator, or a hybrid generator. In one embodiment, controlling the amount of electrical power being generated by or received via the energy resource sourcing energy from solar power comprises: monitoring, by the system controller, an amount of current being produced by a solar array and an amount of current being presently received from the solar array; determining, by the system controller, a preferred current to be received from the solar array by the electrical power system to create at least a portion of the second energy mix; and adjusting, by the resource controller associated with the solar array and based on a set of one or more commands from the system controller, the amount of current being presently received from the solar array such that the amount of current being presently received from the solar array is the same as preferred current to be received from the solar array. In one embodiment, controlling the amount of electrical power being generated by or received via the energy resource sourcing energy from the electric power grid comprises: monitoring, by the system controller, a set of present parameters associated with the electric power grid comprising (i) a present status of the electric power grid, (ii) a real time price of receiving electricity from the electric power grid, and (iii) an amount of current being presently received from the electric power grid; determining, by the system controller and based on the second energy mix, a set of preferred operating parameters associated with the electric power grid comprising a preferred amount of current to be received from the electric power grid; and adjusting, by the resource controller associated with the electric power grid and based on a set of one or more commands from the system controller, the amount of current being presently received from the electric power grid such that the amount of current being presently received from the electric power grid is the same as the preferred amount of current to be received from the electric power grid. In one embodiment, controlling the amount of electrical power being generated by or received via the energy resource sourcing energy from a generator comprises: monitoring, by the system controller, a set of present operating parameters of the generator comprising (i) a type of fuel or fuel mix being used to power the generator, and (ii) a current being produced by the generator; determining, by the system controller, a set of preferred operating parameters for the generator to generate at least a portion of the second energy mix; and adjusting, by the resource controller associated with the generator and based on a set of one or more commands from the system controller, the operation of the generator such that the present operating parameters are the same as the preferred operating parameters. In one embodiment, controlling the amount of electrical power being generated by or received via the energy resource sourcing energy from battery power: monitoring, by the system controller, a set of present operating parameters of a battery energy storage device comprising (i) an amount of energy available in the battery energy storage device, (ii) the types of energy resources being used to charge the battery energy storage device, and (iii) a rate of charge or discharge of the battery; determining, by the system controller, a set of preferred operating parameters for the battery energy storage device to provide at least a portion of the second energy mix; and adjusting, by the resource controller associated with the battery energy storage device and based on a set of one or more commands from the system controller, the operation of the battery energy storage device such that the present operating parameters are the same as the preferred operating parameters. In one embodiment, each of the different types of energy resources are off-grid or behind-the-meter. In one embodiment, the method also includes receiving a carbon intensity value for a local electric power grid; comparing the preferred carbon intensity value to the carbon intensity value for the local grid; and displaying the difference in the preferred carbon intensity value and the carbon intensity value of the local grid. The present disclosure also introduces a system configured to control a plurality of energy resources of an electrical power system to create a preferred energy mix, the system comprising a non-transitory computer readable medium having stored thereon a plurality of instructions, wherein the instructions are executed with one or more processors so that the following steps are executed: calculating a first energy mix using a system controller, comprising: receiving, by the system controller, real time data via at least one resource controller associated with an energy resource, wherein the energy resource is one of the plurality of energy resources, wherein the data received by the system controller comprises an amount of electrical power being generated by or received via the energy resource, wherein each energy resource sources energy from a different type of energy resource, wherein the different types of energy resources and the amount of electrical power being generated by each energy resource associated with the different types of energy resources make up a first energy mix of the electrical power system; and identifying, based on the real time data received, the first energy mix of the electrical power system; calculating, based on the first energy mix of the electrical power system, a set of first charge parameters comprising: a first energy cost, a first carbon intensity value, a first energy efficiency value, and a first resiliency value; identifying a set of preferred charge parameter(s) for a charge request, wherein the set of preferred charge parameter(s) comprises at least one of: a preferred energy cost associated with the charge request, a preferred carbon intensity value associated with the charge request, a preferred energy efficiency value associated with the charge request, or a preferred resiliency value associated with the charge request; identifying, using the system controller, a second energy mix that comprises an amount of electrical power needed from each energy resource input to achieve the set of preferred charge parameter(s); wherein the second energy mix is the preferred energy mix; and controlling, by the system controller, the amount of electrical power being generated by or received via the energy resource input associated with each resource controller to achieve the second energy mix. In one embodiment, the charge request is received from a user, wherein the charge request is associated with a charge of an electric vehicle; and wherein identifying the preferred charge parameter(s) for the charge request comprises: identifying a set of optimized charge parameters for the charge request comprising: an optimized energy cost, and an optimized carbon intensity value; displaying, for selection, one or more of the optimized charge parameter(s) to the user; and receiving a selection of one of the optimized charge parameters, wherein the selected optimized charge parameters is the preferred charge parameter(s). In one embodiment, the instructions are executed with the one or more processors so that the following step is also executed: storing the selected optimized charge parameter; identifying, based on the stored selected optimized charge parameter, a trend in user selections; and predicting future preferred charge parameter(s) based on the identified trends. In one embodiment, identifying the set of preferred charge parameter(s) for the charge request comprises: receiving a preferred net profit per charge; determining a total price to charge for completing the charge request; and calculating the preferred energy cost based on the preferred net profit per charge and the total price to charge for completing the charge request. In one embodiment, different types of energy resources comprise one or more of: solar power, the electric power grid, battery power, an engine driven generator, or a hybrid generator. In one embodiment, controlling the amount of electrical power being generated by or received via the energy resource sourcing energy from solar power comprises: monitoring, by the system controller, an amount of current being produced by a solar array and an amount of current being presently received from the solar array; determining, by the system controller, a preferred current to be received from the solar array by the electrical power system to create at least a portion of the second energy mix; and adjusting, by the resource controller associated with the solar array and based on a set of one or more commands from the system controller, the amount of current being presently received from the solar array such that the amount of current being presently received from the solar array is the same as preferred current to be received from the solar array. In one embodiment, controlling the amount of electrical power being generated by or received via the energy resource sourcing energy from the electric power grid comprises: monitoring, by the system controller, a set of present parameters associated with the electric power grid comprising (i) a present status of the electric power grid, (ii) a real time price of receiving electricity from the electric power grid, and (iii) an amount of current being presently received from the electric power grid; determining, by the system controller and based on the second energy mix, a set of preferred operating parameters associated with the electric power grid comprising a preferred amount of current to be received from the electric power grid; and adjusting, by the resource controller associated with the electric power grid and based on a set of one or more commands from the system controller, the amount of current being presently received from the electric power grid such that the amount of current being presently received from the electric power grid is the same as the preferred amount of current to be received from the electric power grid. In one embodiment, controlling the amount of electrical power being generated by or received via the energy resource sourcing energy from a generator comprises: monitoring, by the system controller, a set of present operating parameters of the generator comprising (i) a type of fuel or fuel mix being used to power the generator, and (ii) a current being produced by the generator; determining, by the system controller, a set of preferred operating parameters for the generator to generate at least a portion of the second energy mix; and adjusting, by the resource controller associated with the generator and based on a set of one or more commands from the system controller, the operation of the generator such that the present operating parameters are the same as the preferred operating parameters. In one embodiment, controlling the amount of electrical power being generated by or received via the energy resource sourcing energy from battery power: monitoring, by the system controller, a set of present operating parameters of a battery energy storage device comprising (i) an amount of energy available in the battery energy storage device, (ii) the types of energy resources being used to charge the battery energy storage device, and (iii) a rate of charge or discharge of the battery; determining, by the system controller, a set of preferred operating parameters for the battery energy storage device to provide at least a portion of the second energy mix; and adjusting, by the resource controller associated with the battery energy storage device and based on a set of one or more commands from the system controller, the operation of the battery energy storage device such that the present operating parameters are the same as the preferred operating parameters. In one embodiment, each of the different types of energy resources are off-grid or behind-the-meter. In one embodiment, the instructions are executed with the one or more processors so that the following step is also executed: receiving a carbon intensity value for a local electric power grid; comparing the preferred carbon intensity value to the carbon intensity value for the local grid; and displaying the difference in the preferred carbon intensity value and the carbon intensity value of the local grid.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations and this is within the contemplated scope of disclosure herein, unless stated otherwise.

The phrase "at least one of A and B" should be understood to mean "A, B, or both A and B." The phrases "one or more of the following: A, B, and C" and "one or more of A, B, and C" should each be understood to mean "A, B, or C; A and B, B and C, or A and C; or all three of A, B, and C."

The foregoing outlines features of several implementations so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the implementations introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Methods within the scope of the present disclosure may be local or remote in nature. These methods, and any controllers discussed herein, may be achieved by one or more intelligent adaptive controllers, programmable logic controllers, artificial neural networks, and/or other adaptive and/or "learning" controllers or processing apparatus. For example, such methods may be deployed or performed via PLC, PAC, PC, one or more servers, desktops, handhelds, and/or any other form or type of computing device with appropriate capability.

Although several example embodiments have been described in detail above, the embodiments described are example only and are not limiting, and those of ordinary skill in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method for controlling, a plurality of energy resources of an electrical power system to create a preferred energy mix, comprising:
    calculating a first energy mix using a system controller, comprising:
        receiving, by the system controller, real time data via at least one resource controller associated with an energy resource,
            wherein the energy resource is one of the plurality of energy resource,
            wherein the data received by the system controller comprises an amount of electrical power being generated by or received via the energy resource,
            wherein each energy resource sources energy from a different type of energy resource,
            wherein the different types of energy resources and the amount of electrical power being generated by each energy resource associated with the different types of energy resources make up a first energy mix of the electrical power system; and
        identifying, based on the real time data received, the first energy mix of the electrical power system;
    calculating, based on the first energy mix of the electrical power system, a set of first charge parameters comprising:
        a first energy cost,
        a first carbon intensity value,
        a first energy efficiency value, and
        a first resiliency value;
    identifying preferred charge parameter(s) for a charge request, wherein the preferred charge parameter(s) comprises at least one of:
        a preferred energy cost associated with the charge request,
        a preferred carbon intensity value associated with the charge request,
        a preferred energy efficiency value associated with the charge request, or
        a preferred resiliency value associated with the charge request;
    identifying, using the system controller, a second energy mix that comprises an amount of electrical power needed from each energy resource input to achieve the preferred charge parameter(s);
    wherein the second energy mix is the preferred energy mix; and
    controlling, by the system controller, the amount of electrical power being generated by or received via the energy resource associated with each resource controller to achieve the preferred energy mix.

2. The method of claim 1,
    wherein the charge request is received from a user,
    wherein the charge request is associated with a charge of an electric vehicle; and
    wherein identifying the preferred charge parameter(s) for the charge request comprises:
        identifying a set of optimized charge parameters for the charge request comprising:
            an optimized energy cost, and
            an optimized carbon intensity value;
        displaying, for selection, one or more of the optimized charge parameter(s) to the user; and
        receiving a selection of one of the optimized charge parameters, wherein the selected optimized charge parameters is the preferred charge parameter(s).

3. The method of claim 2, further comprising:
    storing the selected optimized charge parameter;
    identifying, based on the stored selected optimized charge parameter, a trend in user selections;
    predicting future preferred charge parameter(s) based on the identified trends; and
    optimizing placement of the electrical power system and the types of energy resources available to fulfill charge requests with the predicted future preferred charge parameter(s).

4. The method of claim 1, wherein identifying the set of preferred charge parameter(s) for the charge request comprises:
    receiving a preferred net profit per charge;
    determining a total price to charge for completing the charge request; and
    calculating the preferred energy cost based on the preferred net profit per charge and the total price to charge for completing the charge request.

5. The method of claim 1, wherein different types of energy resources comprise one or more of:
    solar power,
    the electric power grid,
    battery power, or
    an engine driven generator.

6. The method of claim 5, wherein controlling the amount of electrical power being generated by or received via the energy resource sourcing energy from solar power comprises:
    monitoring, by the system controller, an amount of current being produced by a solar array and an amount of current being presently received from the solar array;
    determining, by the system controller, a preferred current to be received from the solar array by the electrical power system to create at least a portion of the second energy mix; and
    adjusting, by the resource controller associated with the solar array and based on a set of one or more commands from the system controller, the amount of current being presently received from the solar array such that the amount of current being presently received from the solar array is the same as preferred current to be received from the solar array.

7. The method of claim 5,
wherein controlling the amount of electrical power being generated by or received via the energy resource sourcing energy from the electric power grid comprises:
monitoring, by the system controller, a set of present parameters associated with the electric power grid comprising (i) a present status of the electric power grid, (ii) a real time price of receiving electricity from the electric power grid, and (iii) an amount of current being presently received from the electric power grid;
determining, by the system controller and based on the second energy mix, a set of preferred operating parameters associated with the electric power grid comprising a preferred amount of current to be received from the electric power grid; and
adjusting, by the resource controller associated with the electric power grid and based on a set of one or more commands from the system controller, the amount of current being presently received from the electric power grid such that the amount of current being presently received from the electric power grid is the same as the preferred amount of current to be received from the electric power grid; and
wherein controlling the amount of electrical power being generated by or received via the energy resource sourcing energy from a generator comprises:
monitoring, by the system controller, a set of present operating parameters of the generator comprising (i) a type of fuel or fuel mix being used to power the generator, and (ii) a current being produced by the generator;
determining, by the system controller, a set of preferred operating parameters for the generator to generate at least a portion of the second energy mix; and
adjusting, by the resource controller associated with the generator and based on a set of one or more commands from the system controller, the operation of the generator such that the present operating parameters are the same as the preferred operating parameters.

8. The method of claim 5, wherein controlling the amount of electrical power being generated by or received via the energy resource sourcing energy from battery power:
monitoring, by the system controller, a set of present operating parameters of a battery energy storage device comprising (i) an amount of energy available in the battery energy storage device, (ii) the types of energy resources being used to charge the battery energy storage device, and (iii) a rate of charge or discharge of the battery;
determining, by the system controller, a set of preferred operating parameters for the battery energy storage device to provide at least a portion of the second energy mix; and
adjusting, by the resource controller associated with the battery energy storage device and based on a set of one or more commands from the system controller, the operation of the battery energy storage device such that the present operating parameters are the same as the preferred operating parameters.

9. The method of claim 1, wherein each of the different types of energy resources are off-grid or behind-the-meter.

10. The method of claim 1, further comprising:
receiving a carbon intensity value for a local electric power grid;
comparing the preferred carbon intensity value to the carbon intensity value for the local grid; and
displaying the difference in the preferred carbon intensity value and the carbon intensity value of the local grid.

11. A system configured to control a plurality of energy resources of an electrical power system to create a preferred energy mix, the system comprising a non-transitory computer readable medium having stored thereon a plurality of instructions, wherein the instructions are executed with one or more processors so that the following steps are executed:
calculating a first energy mix using a system controller, comprising:
receiving, by the system controller, real time data via at least one resource controller associated with an energy resource,
wherein the energy resource is one of the plurality of energy resources,
wherein the data received by the system controller comprises an amount of electrical power being generated by or received via the energy resource,
wherein each energy resource sources energy from a different type of energy resource,
wherein the different types of energy resources and the amount of electrical power being generated by each energy resource associated with the different types of energy resources make up a first energy mix of the electrical power system; and
identifying, based on the real time data received, the first energy mix of the electrical power system;
calculating, based on the first energy mix of the electrical power system, a set of first charge parameters comprising:
a first energy cost,
a first carbon intensity value,
a first energy efficiency value, and
a first resiliency value;
identifying a set of preferred charge parameter(s) for a charge request, wherein the set of preferred charge parameter(s) comprises at least one of:
a preferred energy cost associated with the charge request,
a preferred carbon intensity value associated with the charge request,
a preferred energy efficiency value associated with the charge request, or
a preferred resiliency value associated with the charge request;
identifying, using the system controller, a second energy mix that comprises an amount of electrical power needed from each energy resource input to achieve the set of preferred charge parameter(s);
wherein the second energy mix is the preferred energy mix; and
controlling, by the system controller, the amount of electrical power being generated by or received via the energy resource input associated with each resource controller to achieve the second energy mix.

12. The system of claim 11,
wherein the charge request is received from a user,
wherein the charge request is associated with a charge of an electric vehicle; and wherein identifying the preferred charge parameter(s) for the charge request comprises:
  identifying a set of optimized charge parameters for the charge request comprising:
    an optimized energy cost, and
    an optimized carbon intensity value;
  displaying, for selection, one or more of the optimized charge parameter(s) to the user; and
  receiving a selection of one of the optimized charge parameters, wherein the selected optimized charge parameters is the preferred charge parameter(s).

13. The system of claim 11, wherein the instructions are executed with the one or more processors so that the following step is also executed:
  storing the selected optimized charge parameter;
  identifying, based on the stored selected optimized charge parameter, a trend in user selections; and
  predicting future preferred charge parameter(s) based on the identified trends.

14. The system of claim 11, wherein identifying the set of preferred charge parameter(s) for the charge request comprises:
  receiving a preferred net profit per charge;
  determining a total price to charge for completing the charge request; and
  calculating the preferred energy cost based on the preferred net profit per charge and the total price to charge for completing the charge request.

15. The system of claim 11, wherein different types of energy resources comprise one or more of:
  solar power,
  the electric power grid,
  battery power, or
  an engine driven generator.

16. The system of claim 15, wherein controlling the amount of electrical power being generated by or received via the energy resource sourcing energy from solar power comprises:
  monitoring, by the system controller, an amount of current being produced by a solar array and an amount of current being presently received from the solar array;
  determining, by the system controller, a preferred current to be received from the solar array by the electrical power system to create at least a portion of the second energy mix; and
  adjusting, by the resource controller associated with the solar array and based on a set of one or more commands from the system controller, the amount of current being presently received from the solar array such that the amount of current being presently received from the solar array is the same as preferred current to be received from the solar array.

17. The system of claim 15,
wherein controlling the amount of electrical power being generated by or received via the energy resource sourcing energy from the electric power grid comprises:
  monitoring, by the system controller, a set of present parameters associated with the electric power grid comprising (i) a present status of the electric power grid, (ii) a real time price of receiving electricity from the electric power grid, and (iii) an amount of current being presently received from the electric power grid;
  determining, by the system controller and based on the second energy mix, a set of preferred operating parameters associated with the electric power grid comprising a preferred amount of current to be received from the electric power grid; and
  adjusting, by the resource controller associated with the electric power grid and based on a set of one or more commands from the system controller, the amount of current being presently received from the electric power grid such that the amount of current being presently received from the electric power grid is the same as the preferred amount of current to be received from the electric power grid; and
wherein controlling the amount of electrical power being generated by or received via the energy resource sourcing energy from a generator comprises:
  monitoring, by the system controller, a set of present operating parameters of the generator comprising (i) a type of fuel or fuel mix being used to power the generator, and (ii) a current being produced by the generator;
  determining, by the system controller, a set of preferred operating parameters for the generator to generate at least a portion of the second energy mix; and
  adjusting, by the resource controller associated with the generator and based on a set of one or more commands from the system controller, the operation of the generator such that the present operating parameters are the same as the preferred operating parameters.

18. The system of claim 15, wherein controlling the amount of electrical power being generated by or received via the energy resource sourcing energy from battery power:
  monitoring, by the system controller, a set of present operating parameters of a battery energy storage device comprising (i) an amount of energy available in the battery energy storage device, (ii) the types of energy resources being used to charge the battery energy storage device, and (iii) a rate of charge or discharge of the battery;
  determining, by the system controller, a set of preferred operating parameters for the battery energy storage device to provide at least a portion of the second energy mix; and
  adjusting, by the resource controller associated with the battery energy storage device and based on a set of one or more commands from the system controller, the operation of the battery energy storage device such that the present operating parameters are the same as the preferred operating parameters.

19. The system of claim 11, wherein each of the different types of energy resources are off-grid or behind-the-meter.

20. The system of claim 11, wherein the instructions are executed with the one or more processors so that the following step is also executed:
  receiving a carbon intensity value for a local electric power grid;
  comparing the preferred carbon intensity value to the carbon intensity value for the local grid; and
  displaying the difference in the preferred carbon intensity value and the carbon intensity value of the local grid.

* * * * *